United States Patent [19]

Antoshenkov

[11] Patent Number: 5,379,422

[45] Date of Patent: Jan. 3, 1995

[54] SIMPLE RANDOM SAMPLING ON PSEUDO-RANKED HIERARCHICAL DATA STRUCTURES IN A DATA PROCESSING SYSTEM

[75] Inventor: Gennady Antoshenkov, Amherst, N.H.

[73] Assignee: Digital Equipment Corporation, Maynard, Mass.

[21] Appl. No.: 822,056

[22] Filed: Jan. 16, 1992

[51] Int. Cl.$^6$ .......................... G06F 15/40; G06F 7/02
[52] U.S. Cl. .................................. 395/600; 364/252; 364/282.1; 364/DIG. 1
[58] Field of Search ........................ 395/375, 600, 700; 364/400, 178

[56] References Cited

U.S. PATENT DOCUMENTS 4,987,536  1/1991  Humblet ............................. 395/325

OTHER PUBLICATIONS

Aragon et al., "Randomized Search Trees", 1989 IEEE pp. 540–545.
D. Montgomery, *Introduction to Statistical Quality Control*, Wiley, 1985, pp. 23–55 and 351–429.
*MS-DOS Version 3.3 Reference Guide*, Compaq Computer Corporation (Feb. 1988), pp. 2-1 to 2-16 and 4-270 to 4-271.
Hobbs & England *Rdb/VMS —A Comprehensive Guide*, Digital Press, Digital Equipment Corp., Maynard, Mass. (1991).
Carey et al., "Object and File Management in the Exodus Extensible Database System," Proceedings of the Twelfth International Conference on Very Large Data Bases, Koyoto, (Aug. 1986), pp. 91–100.
Olken & Rotem, "Random Sampling from B+ trees," Proceedings of the Fifteenth International Conference on Very Large Data Bases, Amsterdam 1989, pp. 269–277.
Jaideep Srivastava, "A Tree Based Access Method (TBSAM) for Fast Processing of Aggregate Queries," Proceedings of the 4th International Conference on Data Engineering, IEEE Computer Society (1988), pp. 504–510.
Donald E. Kunth, *The Art of Computer Programming*, vol. 3, Sorting and Searching, Addison-Wesley Publishing Company, Menlow Park, Calif. (1979), pp. 462–479.
Basic Version 3.3 Reference Guide, 4th Edition, Compaq Computer Corporation (Sep. 1987), pp. 8–321 to 8–323 and 8–340 to 8–341.
Zhang Bo, et al., "A New Weighted Technique in Heuristic Search" (English abstract); Journal of Tsinghua University, vol. 26, No. 3, 1986, China, pp. 10–17.

*Primary Examiner*—Thomas G. Black
*Assistant Examiner*—Jennifer M. Orzech
*Attorney, Agent, or Firm*—Arnold, White & Durkee

[57] ABSTRACT

A random sample is obtained from an inverted tree data structure by maintaining a cardinality estimate for each intermediate node in the tree, and selecting a leaf node at random by descending from the root node and performing an acceptance/rejection selection at each intermediate node weighted proportional to the cardinality estimates of the children and weighted inversely proportional to the cardinality estimate of the intermediate node. Even though the selection of an intermediate node is based upon only an estimate of the true cardinality of the intermediate node, the error in the estimate does not cause bias in the overall sampling method because any bias in the selection of the intermediate node is cancelled by an opposite bias in the selection of the child of the intermediate node. The cardinality estimates are maintained when a leaf is inserted or deleted from the data structure by checking whether the insertion or deletion causes the cardinality estimate of a parent of the leaf node to differ from the actual cardinality by a predetermined error bound, and if so, the cardinality estimate of the parent is updated, and the checking and updating process is escalated up the tree. The error bound is adjustable for balancing rejection rate during sampling against I/O overhead of cardinality maintenance during database updates.

27 Claims, 13 Drawing Sheets

| DB\DIRECTORY | | DB_CARDINALITY_ ESTIMATE | | ⎯81 |
|---|---|---|---|---|
| ADMINISTRATION | DIR | CARDINALITY_ESTIMATE | PB | ⎯82 |
| MANUFACTURING | DIR | CARDINALITY_ESTIMATE | PF | |
| SALES | DIR | CARDINALITY_ESTIMATE | PJ | |

FIG. 7A

| DB\ADMINISTRATION\DIRECTORY | | | |
|---|---|---|---|
| ACCOUNTING | DIR | CARDINALITY_ESTIMATE | PC |
| CEO | DIR | CARDINALITY_ESTIMATE | PD |
| PERSONNEL | DIR | CARDINALITY_ESTIMATE | PE |

FIG. 7B

| DB\ADMINISTRATION\ACCOUNTING\DIRECTORY | | | |
|---|---|---|---|
| EMPLOYEES | FILE | SIZE | P1 |

FIG. 7C

| DB\ADMINISTRATION\CEO\DIRECTORY | | | |
|---|---|---|---|
| EMPLOYEES | FILE | SIZE | P2 |

FIG. 7D

| DB\ADMINISTRATION\PERSONNEL\DIRECTORY | | | |
|---|---|---|---|
| EMPLOYEES | FILE | SIZE | P3 |

FIG. 7E

| DB\MANUFACTURING\DIRECTORY | | | |
|---|---|---|---|
| ENGINEERING | DIR | CARDINALITY_ESTIMATE | PG |
| PLANT | DIR | CARDINALITY_ESTIMATE | PJ |

FIG. 7F

| DB\MANUFACTURING\ENGINEERING\DIRECTORY | | | |
|---|---|---|---|
| PRODUCT | DIR | CARDINALITY_ESTIMATE | PH |
| R_&_D | DIR | CARDINALITY_ESTIMATE | PI |

FIG. 7G

| DB\MANUFACTURING\ENGINEERING\PRODUCT\DIRECTORY | | | |
|---|---|---|---|
| EMPLOYEES | FILE | SIZE | P4 |

FIG. 7H

| DB\MANUFACTURING\ENGINEERING\R_&_D\DIRECTORY | | | P5 |
|---|---|---|---|
| EMPLOYEES | FILE | SIZE | |

FIG. 7I

| DB\MANUFACTURING\PLANT\DIRECTORY | | | P6 |
|---|---|---|---|
| EMPLOYEES | FILE | SIZE | |

FIG. 7J

| DB\SALES\DIRECTORY | | | |
|---|---|---|---|
| DOMESTIC | DIR | CARDINALITY_ESTIMATE | PL |
| FOREIGN | DIR | CARDINALITY_ESTIMATE | PO |

FIG. 7K

| DB\SALES\DOMESTIC\DIRECTORY | | | |
|---|---|---|---|
| EASTERN | DIR | CARDINALITY_ESTIMATE | PM |
| WESTERN | DIR | CARDINALITY_ESTIMATE | PN |

FIG. 7L

| DB\SALES\DOMESTIC\EASTERN\DIRECTORY | | | |
|---|---|---|---|
| EMPLOYEES | FILE | SIZE | P7 |

FIG. 7M

| DB\SALES\DOMESTIC\WESTERN\DIRECTORY | | | |
|---|---|---|---|
| EMPLOYEES | FILE | SIZE | P8 |

FIG. 7N

| DB\SALES\FOREIGN\DIRECTORY | | | |
|---|---|---|---|
| EMPLOYEES | FILE | SIZE | P9 |

FIG. 7O

SIMPLE RANDOM SAMPLING ON PSEUDO-RANKED HIERARCHICAL DATA STRUCTURES IN A DATA PROCESSING SYSTEM

BACKGROUND OF THE INVENTION

1. Technical Field

The present invention relates to data processing, and more particularly to random sampling of data items in a hierarchical data structure such as a "tree."

2. Description of the Related Art

Data items in a database are regularly sampled for statistical applications such as financial auditing, inventory control, and quality control. Although various sampling methods are used, the objective is to select a representative sample of the data items, so that conclusions about a large population of data items in the database can be estimated from a relatively small number of data items in the sample. See, for example, D. Montgomery, *Introduction to Statistical Quality control*, Wiley, 1985, pp. 23–55 and 351–429.

A widely used method of sampling is known as "random" sampling. Random sampling on a set of data items numbered 1 to K is defined as a selection of a subset of data items having numbers that are randomly scattered on the [1:K] interval. Preferably, the numbers are also uniformly distributed over the [1:K] interval. This special case is known as simple or unbiased random sampling, and it prevents any correlation of the sampled subset with any meaningful data characteristic.

In most database systems, data items are indexed by keys to permit retrieval of specified data items, but the data items are not assigned consecutive numbers. If consecutive numbers were initially assigned as keys, for example, then the deletion of a single data item, except the one assigned the highest key, would require re-assignment of some of the keys to preserve consecutive numbering. For complex data structures, re-assignment of consecutive numbers to the data items also interferes with activities such as compression, clustering, and multi-table intermix.

One kind of complex data structure in widespread use is a hierarchical data structure that looks like an inverted tree. For this reason it is known simply as a tree. The MS-DOS (Trademark) operating system for personal computers written by Microsoft Corporation, for example, uses a tree for indexing files stored in disk memory. The tree is known as a directory for a disk drive. The tree includes a main directory corresponding to the "root" of the tree, a subdirectory for each "branch" or intermediate node of the tree, and a file for each "leaf" of the tree. The root directory, each subdirectory, and each file is assigned a name. Although the file name is a "key" for a specified file, it does not uniquely specify the file, because the same file name can be assigned to different files in different directories. A file is accessed by searching a specified path in the tree, beginning with the root directory. Therefore a file is specified by a "path name" including the root name followed by any subdirectory names along the path, followed by the file name. A backslash ( ) symbol is used as a delimiter between the various names. See, for example, *MS-DOS Version 3.3 Reference Guide*, Compaq Computer Corporation (February 1988), pp. 2-1 to 2-16.

Trees are also widely used in relational database systems for sorted indexed retrieval of records. Each record is a row in a table, and a key is assigned to each record. Each record is also a leaf in a hierarchical index in the form of an inverted tree, but in this case each leaf in the tree has the same depth. In other words, each leaf is connected to the root by the same number of branches.

Sorted indexed retrieval is an efficient method of retrieving exact matches in response to the complete value of the key (corresponding to the "path name" described above combined with the key assigned to the row in table). Sorted indexed retrieval is also useful for finding out whether a row with a certain key value exists in a table. The search for a record having a specified complete key value is facilitated by maintaining the "branch names" in a sorted list in the root directory and each sub-directory of the tree.

To define a tree index for a database, a database administrator may issue a "CREATE INDEX" statement to the database system. In this "CREATE INDEX" statement, the administrator specifies a string of identifiers of attribute fields in each table, and in response the database system creates a tree having a level of branches corresponding to each attribute field, and at each level, the database system creates a branch corresponding to each distinct value in the attribute field appearing in the tables. The "CREATE INDEX" command may also indicate that the indexes of keys are to be maintained in a sorted condition.

Further details about sorted tree indexing are found in Hobbs & England, *Rdb/VMS—A Comprehensive Guide*, Digital Press, Digital Equipment Corporation, Maynard, Mass. (1991). Design considerations for database management systems using tree indexing are also described in Carey et al., "Object and File Management in the EXODUS Extensible Database System," Proceedings of the Twelfth International Conference on Very Large Data Bases, Koyoto, (August, 1986) pp. 91–100.

Current methods for random sampling of data items from trees are either highly biased or expensive. Some of these methods are compared and contrasted in Olken & Rotem, "Random Sampling from B+ trees," Proceedings of the Fifteenth International conference on Very Large Data Bases, Amsterdam, 1989, pp. 269–277.

An easy method of random sampling from a tree is to perform a random walk from the root to a leaf. In other words, while descending from the root, a branch is selected randomly at each level. This method, however, may deliver an extremely biased sampling, because the nodes at each level may have different numbers of branches, leading to preferred selection of paths having fewer branches. Experiments with indexes in the Rdb/VMS (Trademark) database system, for example, have shown that a small region of an index can contain a majority of the samples, making this easy method highly biased.

For a tree having all of its leaves at the same bottom level, it is known to eliminate bias by performing an acceptance/rejection test at each level during descent from the root so that each branch at each level has an equal chance of being selected, and therefore each leaf will have an equal chance of being selected. In other words, the sampling of a leaf will be simple and unbiased. Acceptance/rejection sampling in such a fashion, however, requires a probability of selecting any one branch at each node to be less than or equal to the probability of selecting the branch at the node having the maximum number of branches. The maximum number of branches in a tree is referred to as the "maximum fanout." In most systems the maximum fanout is either very large or limited only by the memory capacity of a single index page of the particular data processing system, but many nodes will have only a few branches. These conditions dictate that acceptance-rejection sampling in the above fashion requires a high average rate of rejection. In some typical Rdb/VMS (Trademark) database systems, rejection rates have varied from 99% for a large 913K index to 99.999,993% for a small 8K index, based on the maximum fanout actually found in these databases. Acceptance/rejection sampling in the above fashion therefore requires an inordinate amount of processing time and is impractical.

Another method of random sampling on trees provides simple or unbiased sampling, but at the expense of high overhead in both processing time and data structure maintenance. It is based on the conceptually simple method of identifying the number (K) of leaves, numbering the leaves 1 to K, and then randomly picking a number i within the range [1:K] to select the leaf associated with the number n. The simplicity of this method depends upon storing, for each node in the tree (except the leaves), the number r of leaves that are descendants of the node. Such a tree is known as a "ranked" tree.

In such a ranked tree, it is possible to select an ith leaf during a straight descent from the root by computing a running sum of the numbers of leaves that are descendants at each node along the descent, and selecting branches dependent upon a comparison of the number i to the running sum. To select a leaf at random, the number i is selected at random from the range [1:K], where K is the number of leaves. Although this method provides simple and unbiased sampling, it is impractical, because when a leaf is inserted or deleted, the cardinalities r along the entire path from the root to the leaf have to be updated.

SUMMARY OF THE INVENTION

Briefly, in accordance with the invention, a random sample is obtained from a hierarchical data structure by maintaining a cardinality estimate for each intermediate node in the data structure, and selecting a leaf node at random by descending from the root node and selecting at each node a child of the node by a random selection weighted by the cardinality estimates of the children. Preferably, the cardinality estimates are maintained when a leaf is inserted or deleted from the data structure by checking whether the insertion or deletion causes the cardinality estimate of the parent of the leaf node to differ from the actual cardinality by a predetermined error bound, and if so, the cardinality estimate of the parent is updated, and if so, performing these checking and updating steps for the grand-parent of the parent node. These checking and updating steps are escalated to the root node. The cardinality estimates are updated, for example, whenever a node is split, merged, or rebalanced during an insert or delete operation.

Preferably, a random selection weighted by the cardinality estimates is performed at a node by selecting a number i at random within the range of 1 to K, where K is at least the sum of the cardinality estimates of the children of the node, and comparing the number i to a running sum of the cardinality estimates of the children. Preferably, K is based on the cardinality estimate for the node, and all branches to children nodes of the intermediate node are rejected when the random number i exceeds the sum of the cardinality estimates of all of the children nodes.

Even though the selection of an intermediate node is based upon only an estimate of the true cardinality of the intermediate node, the error in the estimate does not bias the overall sampling method when the selection of the child of the intermediate node is an acceptance/rejection based on a random number ranging from 1 to a high estimate of the true cardinality of the intermediate node, and that high estimate of the true cardinality is used in selecting the intermediate node, because then any bias in the selection of the intermediate node is cancelled by an opposite bias in the selection of the child of the intermediate node.

The present invention is an improvement over all of the three methods previously known for sampling on trees. The present invention eliminates a high, typically unacceptable overhead of branch cardinality maintenance in the ranked trees. Unlike a simple random walk down the tree, the present invention delivers an unbiased sample set. The present invention also slashes the sample rejection rate to manageable levels from the unacceptable levels obtained when using the acceptance/rejection method based on maximum fanout.

The present invention also permits the deviation in the cardinality estimate from the true cardinality to be freely selected. Increasing the deviation reduces database maintenance at the expense of increased rejections, and decreasing the deviation reduces the rejections at the expense of increased maintenance. An optimum deviation can be selected by benchmark testing for any database system.

BRIEF DESCRIPTION OF THE DRAWINGS

Other objects and advantages of the invention will become apparent upon reading the following detailed description and upon reference to the drawings in which:

FIGS. 7A to 7O are schematic representations of directory files storing information for each node in a tree corresponding to the organizational chart of FIG. 3;

Figure 1:
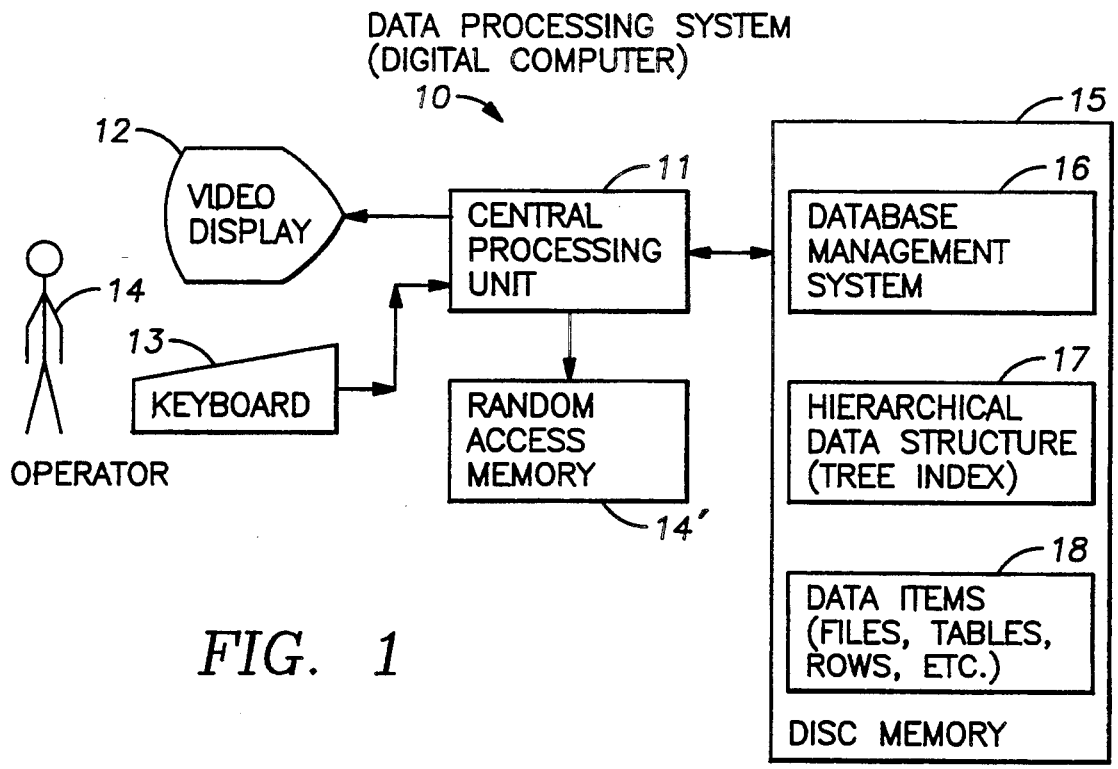
FIG. 1 is a block diagram of a data processing system employing the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the scope of the invention as defined by the appended claims.

DESCRIPTION OF THE PREFERRED EMBODIMENTS

Turning now to FIG. 1 of the drawings, there is shown a block diagram of a data processing system generally designated 10 incorporating the present invention. The data processing system includes a central processing unit 11, a video display 12 and keyboard 13 for communicating with an operator 14, a random access memory 14' and a disk memory 15. It should be apparent that the hardware components are the conventional components of a general purpose digital computer.

The present invention more particularly concerns a method of operating the central processing unit 11 of the digital computer to carry out certain data base query and management functions by executing computer programs that make up a data base management system 16. In particular, the data base management system 16 has facilities for creating and maintaining a hierarchical data structure 17 that indexes numerous data items 18 such as files, records, tables, or rows of data.

Many of the components of the data base management system 16 are provided by a conventional operating system for the digital computer. The MS-DOS (Trademark) operating system for personal computers, for example, includes facilities for creating and maintaining a hierarchical data structure in the form of a tree index for organizing files in disk memory. The MS-DOS (trademark) operating system, for example, includes commands and program-callable functions for creating new directories, searching directories, creating new files, deleting files, deleting directories, displaying directories, and sorting directories or files. So-called data base management systems for relational data bases include even more complex facilities, such as facilities for automatically creating a tree index 17 from a table of rows given specified table attributes. Such automatic generation of the tree index will be further described below in connection with FIGS. 5 and 6. These more advanced facilities, for example, are included in the Rdb/VMS (Trademark) data base management system sold by Digital Equipment Corporation of Maynard, Mass.

Figure 2:
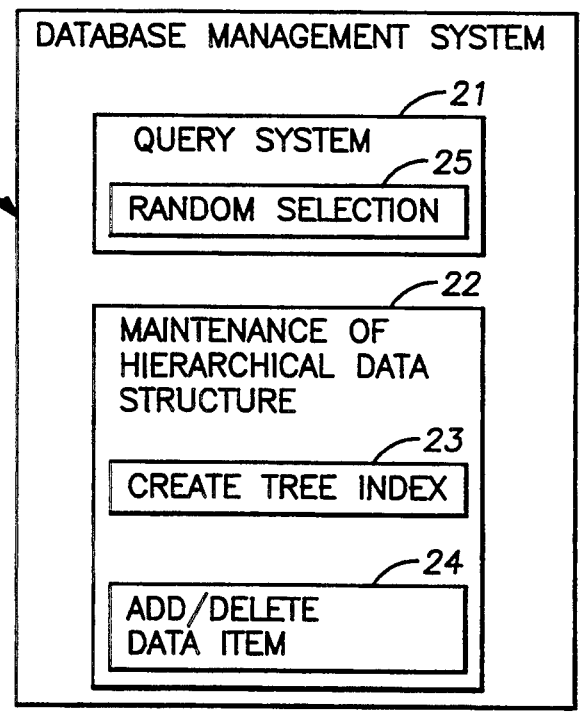
FIG. 2 is a schematic diagram showing software components of the data base management system used in the data processing system of FIG. 1.

Turning now to FIG. 2, the components of the data base management system 16 are shown in further detail. The data base management system includes a query system 21 for selecting a file, table or row given a list of keys that are associated with the files, tables or rows. The data base management system 16 further includes facilities 22 for maintenance of the hierarchical data structure such as a facility 23 for creating a tree index and a facility 24 for adding or deleting a data item that is indexed by the tree index.

The present invention more particularly concerns a random selection feature 25 of the query system 21 and related modifications to the facility 23 for creating a tree index, and to the facility 24 for adding or deleting a data item.

Figures 3, 4:
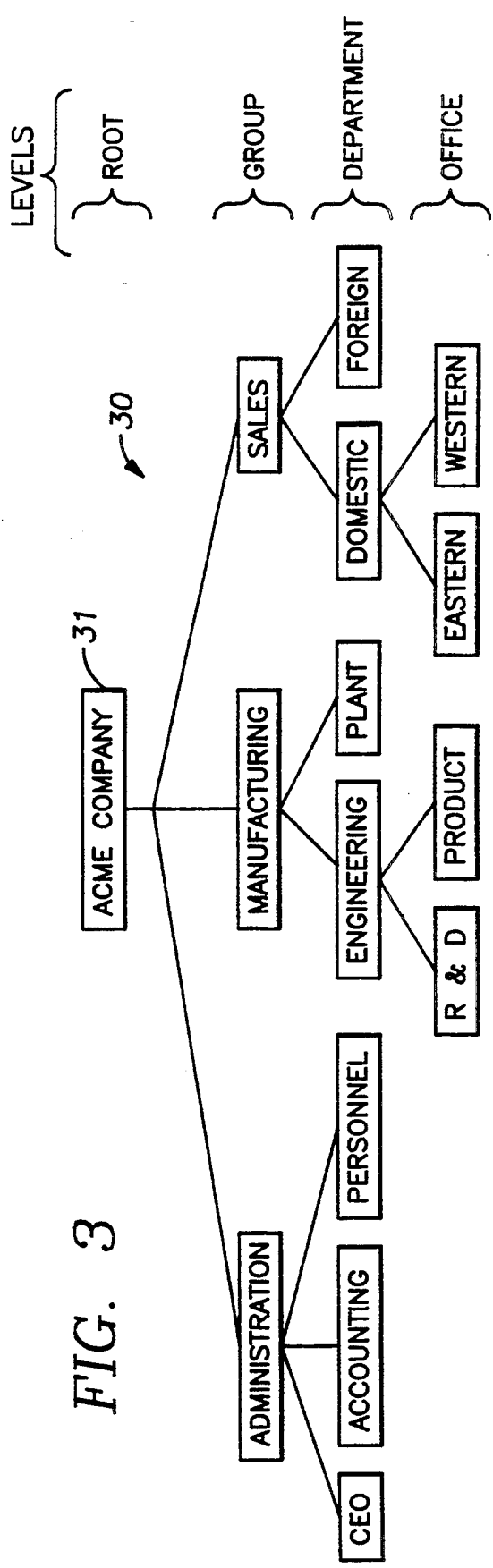
FIG. 3 is a schematic diagram of an organizational chart in the form of an inverted tree.
FIG. 4 is a schematic diagram of data records arranged in a table format.

Turning now to FIG. 3, there is shown an organizational chart of a hypothetical manufacturing company. The organizational chart is hierarchical in nature and is in the form of an inverted tree. The hierarchical nature of the chart results from the fact that each block or node in the chart is related to some other block in the chart by a parent-child or child-parent relationship. In a tree, all of the nodes are linked together by such relationships such that the tree has a "root node" that is a common ancestor of all of the other nodes, intermediate nodes which each correspond to a branch of the tree and have one parent node and one or more children, and "leaf nodes" which do not have any children.

In FIG. 3, the tree has a root 31 representing the entire manufacturing company, which has the name "ACME Company." From the root 31, the tree branches into three groups, including administration, manufacturing, and sales. The tree further branches from these groups to departments having the names CEO, ACCOUNTING, PERSONNEL, ENGINEERING, PLANT, DOMESTIC, and FOREIGN. Some of the departments are further organized into particular offices. The engineering department, for example, has a research and development (R&D) office and a product office. In a similar fashion, the domestic sales department has eastern and western sales offices.

In order to organize computer data records for the ACME Company, the data records are indexed by a hierarchical data structure called a "tree" corresponding to the organizational chart 30 of FIG. 3. Turning to FIG. 4, for example, there is shown a table of personnel records for the employees of ACME Company. The table 40 has a record 41, 42, 43, etc., for each employee. The record for each employee corresponds to a single row in the table 40. The table 40 includes a number of attributes that are named in a header 44 of the table. These table attributes include EMPLOYEE_NAME, GROUP, DEPARTMENT, OFFICE, TITLE, etc.

The employee records in the table 40 of FIG. 4 could be organized in any number of ways, for example, alphabetically. A problem, however, arises when there are a very large number of records, and when there are multiple operators attempting to access the records. If all of the employee records were stored in a single file, for example, then access to a single record would require the entire file to be opened for a single operator, and a large size of the file would make the task of searching the file and modifying a particular file rather cumbersome, especially if these operations were performed by simple techniques, such as placing a lock on the entire file, reading the entire file from disk to RAM, and writing the file from RAM to disk after modification of a single record. These tasks can be made more efficient by storing the records in a multiplicity of files such that related records are grouped together. For the ACME Company, for example, the employee records could be grouped along organizational lines into a separate file for each of the smallest organizational components shown in the organization chart 30 of FIG. 3. In particular, the employee records could be stored in a separate "EMPLOYEES" file for each of the CEO, ACCOUNTING, PERSONNEL, R&D, PRODUCT, PLANT, EASTERN, WESTERN, AND FOREIGN departments or offices.

For large organizations having a complex hierarchy of departments and offices, it is also desirable to adopt a file naming convention that corresponds to the organizational chart of FIG. 3. It is desirable, for example, for each file including employee records to be identified by a common key, such as "EMPLOYEES," and to specify the path through the organizational chart of FIG. 3 to distinguish the similar files. Such a file naming convention is widely used in data base systems not only for the convenience of the operator but also to facilitate the indexing of files in mass storage, such as disk drives.

In large relational data base systems, the advantages of hierarchical indexing are so great that hierarchical indexing may be performed automatically merely for internal organization of stored data. In any case, the retrieval of data organized in a hierarchical fashion is facilitated if the hierarchical organization corresponds to related attributes of the stored data. For this reason, some data base systems, such as the Rdb/VMS (Trademark) data base management system, have a facility for automatically generating a tree index from a list of table attribute names.

Figures 5, 8:
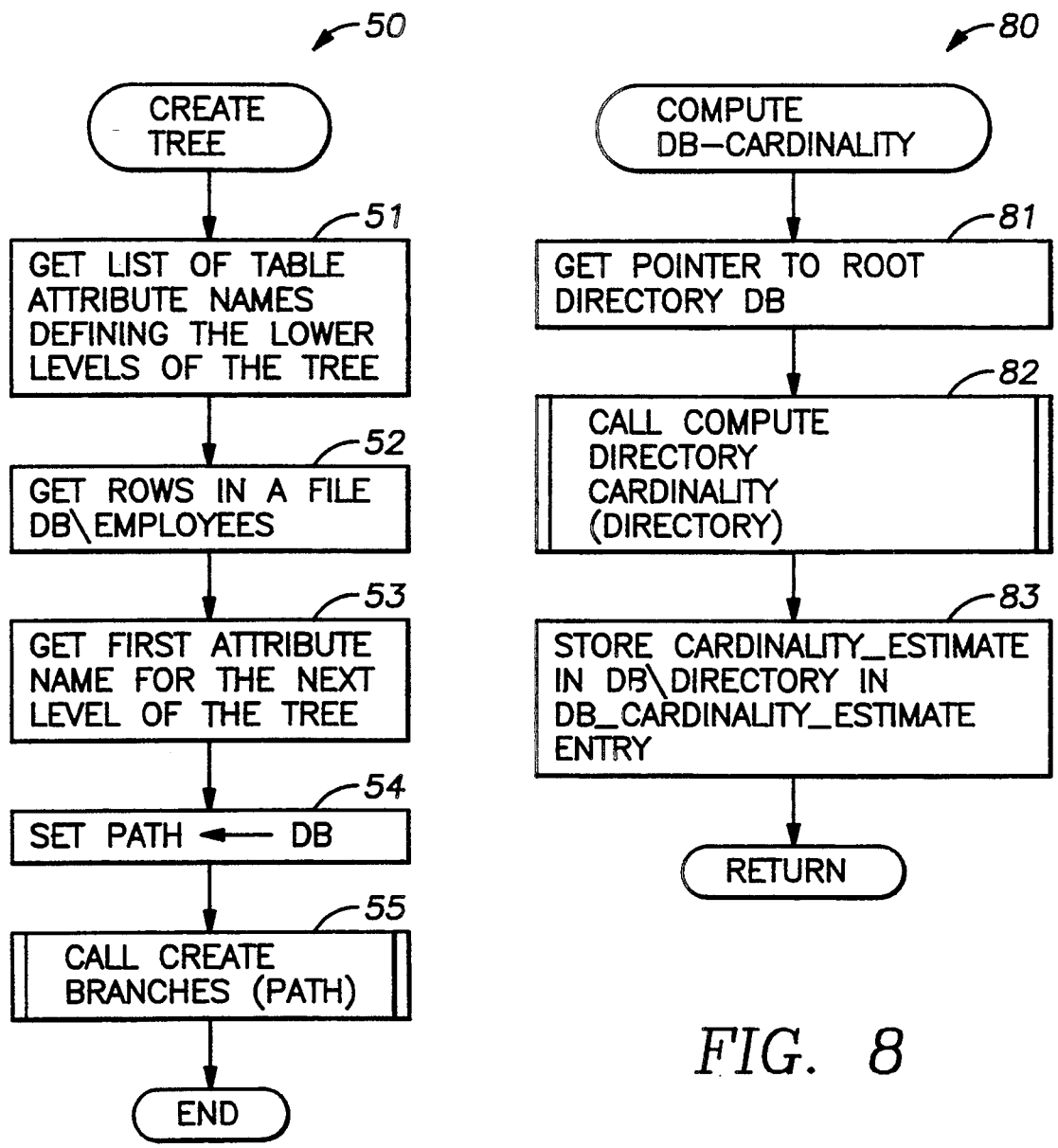
FIG. 5 is a flow chart of a subroutine for creating a tree index for a table of row records as shown in FIG. 4.
FIG. 8 is a flow chart of a subroutine for computing cardinality estimates for each of the nodes in a tree index.
Figure 6:
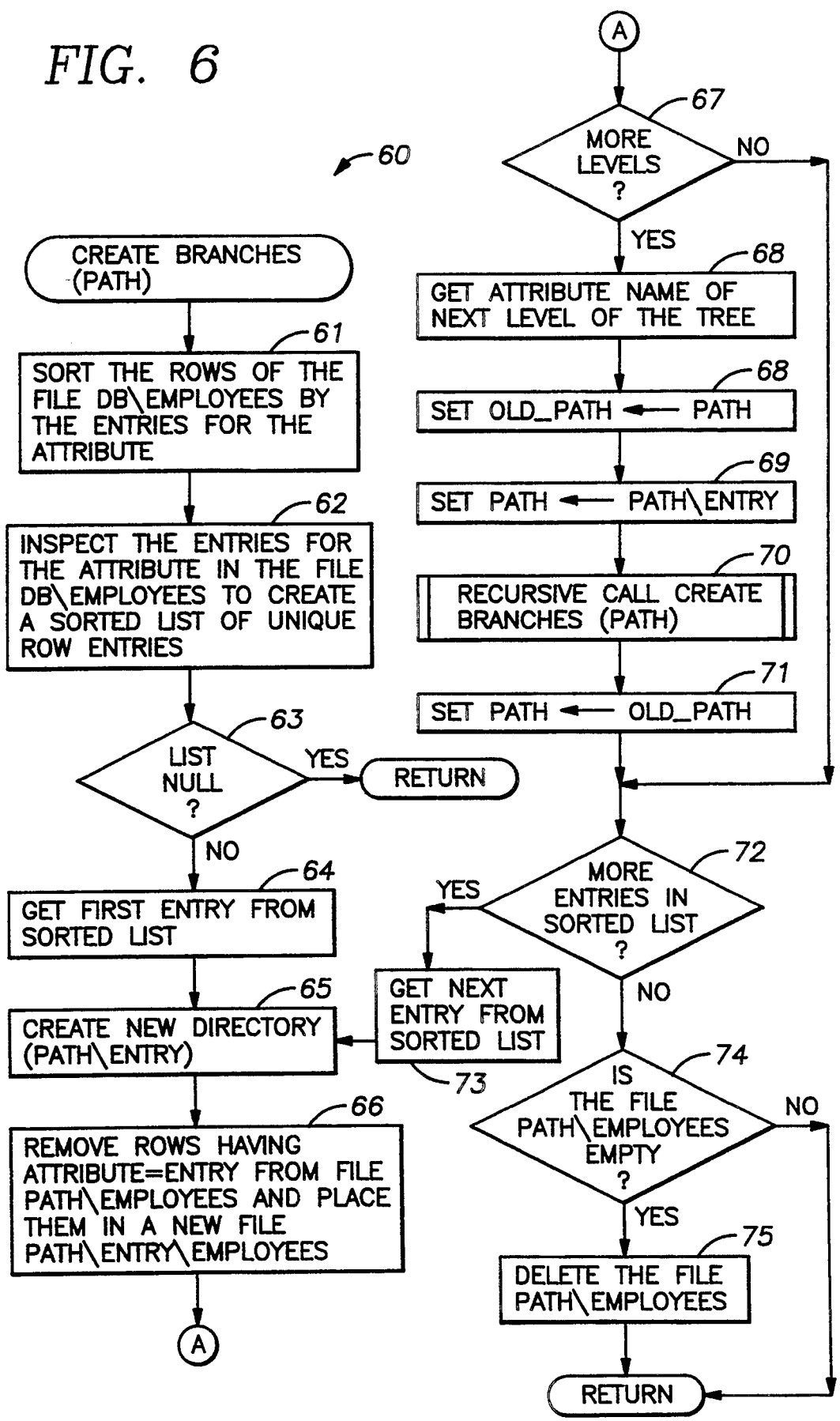
FIG. 6 is a flow chart of a subroutine that is called recursively for creating branches from nodes in the tree index.

The operation of a facility for automatically generating a tree index is illustrated by the flow charts in FIGS. 5 and 6, and the resulting index is illustrated in FIGS. 7A to 7O. The index corresponds to a set of tables called "directories" that are maintained by the data base management system. A comparison of FIG. 3 to FIGS. 7A to 7O reveals that there is a single directory corresponding to each block or node in the organizational chart of FIG. 3. Moreover, the directory "path name" is shown as a header of each directory.

Turning now to FIG. 5, there is shown a flow chart 50 of a subroutine that automatically creates the directory structure of FIGS. 7A to 7O given the data records of FIG. 4 and given the list "GROUP, DEPARTMENT, OFFICE" of table attribute names defining the lower levels of the tree index. It is assumed that the upper-most "root" level has the key "DB" representing the physical disk drive holding all of the files to be indexed.

In the first step 51, the operator (14 in FIG. 1) supplies the list of table attribute names defining the lower levels of the tree. Then, in step 52, the operator supplies a file DB/EMPLOYEES containing the rows of the table 40. Then, in step 53, the first attribute name is taken from the list of table attribute names defining the lower levels of the tree. Next, in step 54, the string "PATH" is set to "DB." Finally, in step 55, a subroutine "CREATE BRANCHES" is called to create all of the branches from the specified path in the tree.

Turning now to FIG. 6, there is shown a flow chart generally designated 60 of the subroutine "CREATE BRANCHES." In the first step 61, the rows of the file DB/EMPLOYEES are sorted by the entries for the attribute that was obtained in step 53 of FIG. 5. Then, in step 62, the entries for that attribute are inspected in the file DB/EMPLOYEES to create a sorted list of unique row entries. In other words, the attribute entry for the first row is placed in the list, and then the other rows in the file are sequentially scanned, and whenever the attribute entry changes, the new attribute entry is added to the list.

In step 63, the sorted list is inspected to see whether it is null. If so, then execution returns. Otherwise, then in step 64, the first entry is obtained from the sorted list. In step 65, a new directory is created having the directory name PATH ENTRY, where PATH and ENTRY are string variables, and the name of the new directory is the concatenation of the value of the string variable path, the delimiter " ", and the value of the string variable ENTRY. Then, in step 66, the rows having the attribute equal to the value of the string variable ENTRY are removed from the file PATH EMPLOYEES and are placed in a new file PATH ENTRY EMPLOYEES. Because the file PATH EMPLOYEES has been sorted on the attribute, step 66 involves removing a beginning portion of the consecutive employee records from the file PATH EMPLOYEES, and placing them in the new file. This need not involve physical transfer of record data because it could be done by transferring or assigning record pointers to the file names in the directories.

In step 67, execution branches depending on whether there are more levels in the hierarchy. In other words, the string variable PATH is inspected to determine whether it has reached the lowest level of the hierarchy defined in FIG. 3. The hierarchy in FIG. 3, for example, has four levels, corresponding to one more than the number of attributes in the list of table attribute names supplied by the operator. When the string variable PATH includes four keys delimited by backslashes, then there are no more levels and execution branches to step 72. Otherwise, execution continues to step 68 to get the attribute name of the next level of the tree from the list of table attribute names supplied by the operator. Then, in step 68, the value of the string variable "PATH" is saved in a variable "OLD_PATH" and the value of the string variable "PATH" is set to the concatenation of itself, a backslash, and the value of the string variable "ENTRY." This is done In advance of a recursive call to the subroutine CREATE BRANCHES. Upon returning from this subroutine call, the old path is restored in step 71.

In step 72, execution branches depending upon whether there are more entries in the sorted list of unique row entries. If so, then in step 73, the next entry is obtained from the sorted list, and execution loops back to step 65 to process this next entry. Eventually, all of the entries in the list are processed, and execution will continue from step 72 to step 74.

Step 74 checks whether the file PATH EMPLOYEES is empty. If not, execution returns. If so, then in step 75, the file PATH EMPLOYEES is deleted, and execution returns.

Due to the recursive call in step 70 of the flow chart 60 in FIG. 6, all of the employee records will eventually reside in a file indexed at the lowest possible level in the tree index. The lowest possible level is not necessarily the lowest level in the organizational chart of FIG. 3, because it is possible for an employee record to fail to specify or associate an employee with such a lowest level in the organization chart. If an employee record, for example, has a null entry for the group, department, and office attributes, for example, the employee record will never be transferred from the original file DB EMPLOYEES. Therefore, in order to obtain the directory structure as shown in FIG. 7A to 7O, every employee record must have had non-null entries for the group and department attributes, and all employees in the engineering and domestic sales departments had non-null entries for the office attribute.

In accordance with an aspect of the present invention, a "weight" or "cardinality estimate" is associated with each intermediate node of a hierarchical data structure. For the specific example in FIGS. 7A to 7O, the cardinality estimate associated with each intermediate node appears in the directory of the node's parent. The root node DB DIRECTORY also has a cardinality estimate, which is stored in its directory of FIG. 7A.

Turning specifically to FIG. 7A, the cardinality estimate of the root directory DB DIRECTORY is stored in the header 81 of the root directory. The root directory includes a list of entries 82 including an entry for each of the children of the root node. Each entry includes the name of the child directory, an indication that the entry is for a directory, the cardinality estimate of the child directory, and a pointer to the child directory. Alternatively, as shown in the directory of FIG. 7C, a directory entry may include the name of a file, an indication that the entry is for a file, the size of the file, and a pointer to the file. In FIG. 7A to 7O, the pointers to the directories are PB, PC, PD, ..., PO, and the pointers to the files of employee records are pointers P1, P2, P3, ..., P9. The pointers, for example, specify an absolute physical address where the directory or file resides on a mass storage device, such as a disk drive.

For practicing the present invention, the cardinality estimate need not be a precise estimate of the true cardinality of the node in the hierarchical data structure. The true cardinality of a node in a hierarchical data structure is defined as the number of descendant leaf nodes in the hierarchy. In the example of FIGS. 3, 4, and 7A to 7O, the leaf nodes in the hierarchy are the table rows or employees records, assuming that the objective is to perform simple random sampling of the rows or employee records. Alternatively, the individual files could be designated as the leaf nodes in the hierarchy, if the objective were to perform simple random sampling of individual files. Alternative definitions of a tree dependent upon the search objective is possible due to the self-similarity property of the tree itself. A sub-tree can be selected from a tree, and a tree can remain a tree when it is pruned of a leaf, branch or sub-tree. These properties facilitate the processing of trees by recursive subroutines as was illustrated in FIGS. 5 and 6 above, and as will be illustrated further below.

In the method of the present invention, the cardinality estimate of a parent node is used in an acceptance/rejection selection of a child node such that the probability of selecting the child node is directly proportional to the cardinality estimate of the child node and inversely proportional to the cardinality estimate of the parent node. As will be described further below, this is a sufficient condition for obtaining simple random sampling of a leaf node having a cardinality estimate of one, because the probability of selecting any node by a walk down the inverted tree becomes directly proportional to the cardinality estimate of the node.

The easiest way of performing such an acceptance/rejection selection is to select a number N randomly from the range of 1 to the cardinality estimate of the parent node, and to compare the number N to a running sum of cardinality estimates for the child nodes. This particular method requires that such a cardinality estimate of the parent node be greater or equal to the sum of such cardinality estimates for the child nodes. Such cardinality estimates are greater or equal to the true cardinality of the nodes, and are therefore high estimates, and they need not, but may be, the cardinality estimates that are actually stored in the directories of FIGS. 7A to 7O.

The high cardinality estimates need not be the cardinality estimates that are actually stored in the directories, because, alternatively, one could store a numerical value that is related by a predetermined mathematical formula to the high cardinality estimates that are actually used for selecting the random number N or for computing the running sums.

In practice, the relative deviation of the high cardinality estimates from the true cardinality is greater for the higher nodes in the inverted tree than for the lower nodes. In an inverted tree in which all of the leaf nodes are at the same bottom level, for example, the relative deviation in the preferred embodiment is an exponential function of the level in the tree, and therefore the high estimate becomes progressively poorer by a certain factor going from a lower level to a next higher level.

Turning now to FIG. 8, there is shown a flow chart generally designated 80 for computing cardinality estimates given a tree index as shown in FIGS. 7A, 7B, 7C, 7D, 7E, 7F, 7G, 7H, 7I, 7J, 7K, 7L, 7M, 7N, 7O. In the first step 81, a pointer to the root directory is obtained, for example, by searching a system directory of data bases or disk drives. Next, in step 82, a subroutine "COMPUTE DIRECTORY CARDINALITY" is called. Finally, in step 83, the cardinality estimate computed by the subroutine is stored in the DB DIRECTORY in the DB_CARDINALITY_ESTIMATE entry.

Figure 9:
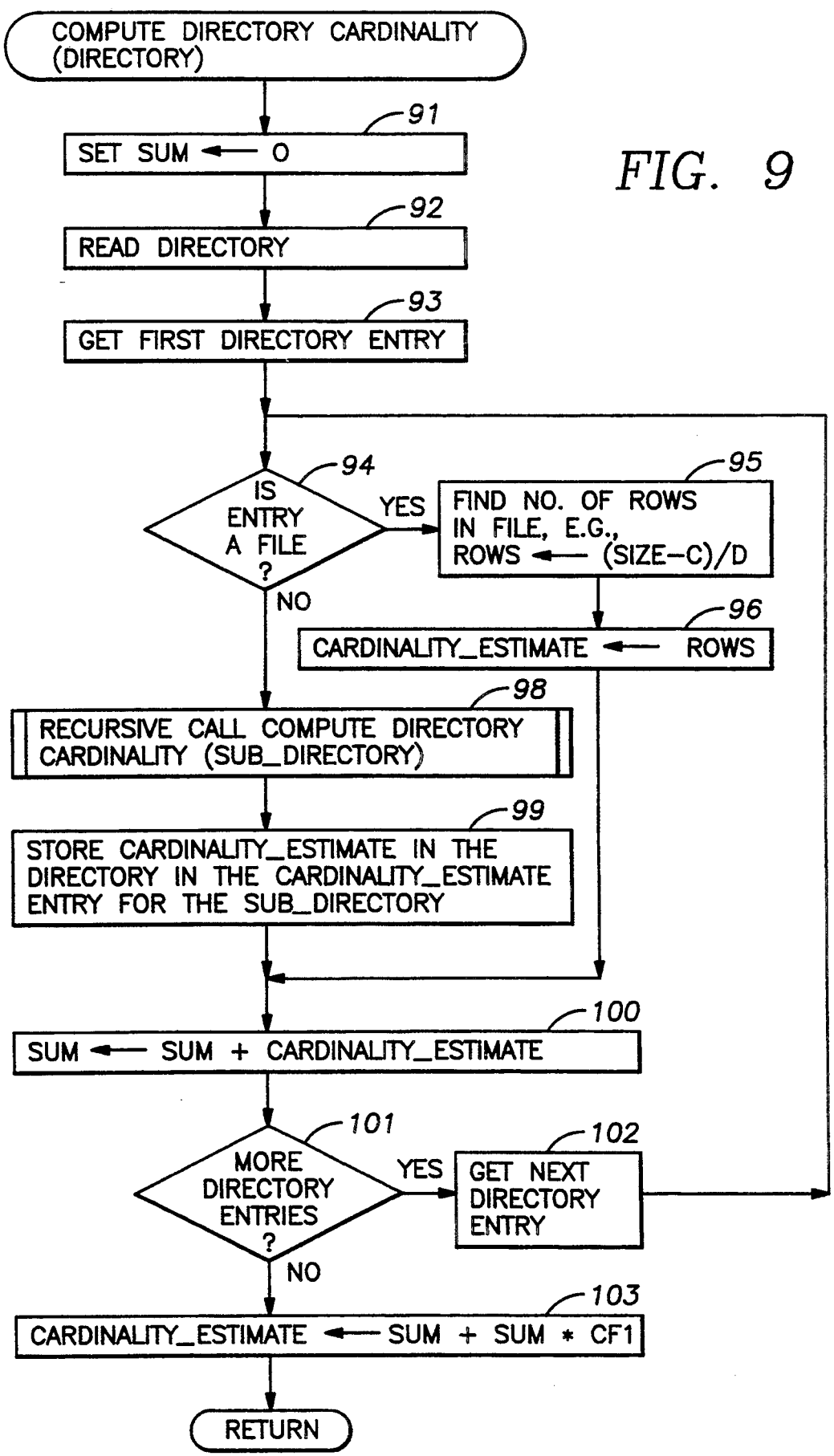
FIG. 9 is a flow chart of a subroutine that is recursively called to compute a cardinality estimate for a particular node or directory in the tree index.

Turning now to FIG. 9, there is shown a flow chart 90 of the COMPUTE DIRECTORY CARDINALITY subroutine which computes the cardinality estimate for a specified directory. In a first step 91, a sum is cleared. Then, in step 92, the specified directory is read from disk memory. Next, in step 93, the first directory entry is obtained. In step 94, execution branches depending on whether the directory entry is a file or is a sub-directory.

If the directory entry is a file, then in step 95, the number of rows in the file is obtained, for example, by subtracting a constant C from the size of the file and dividing the difference by a constant D. The variable SIZE, for example, specifies the size of the file in bytes, the integer variable C is the number of bytes in the header and trailer of the file, and the integer D is the number of bytes in each row, assuming that each row has the same number of bytes. In a file having variable length rows or records, the number of rows is found, for example, by reading the number of rows from the file. A file having variable-length records, for example, stores a key in association with each record and therefore the number of rows or records in a file is related to the number of keys. The number of keys is related to the length of a list of the keys in a key index of the file. Then, in step 96, the cardinality estimate is set equal to the number of rows. In this case, the cardinality estimate for a file is equal to the true cardinality of the file.

As discussed above, the cardinality estimate for a file is set to the number of rows in the file in order to perform simple random sampling of the rows in the file. Alternatively, to perform simple random sampling of the files, the cardinality estimate for each file should be set equal to the same value, such as 1.

If the directory entry is not for a file, then in step 98, the COMPUTE DIRECTORY CARDINALITY subroutine 90 is called recursively to compute the directory cardinality of the sub-directory specified by the directory entry. Then, in step 99, this computed cardinality estimate is stored in the directory in the cardinality estimate entry for the sub-directory.

In step 100, the sum is incremented by the cardinality estimate for the directory entry. Then, in step 101, execution branches to step 102 to get the next directory entry, and execution loops back to step 94 to process the next directory entry. After all the directory entries are processed, execution continues from step 101 to step 103. In step 103, a high cardinality estimate is obtained by increasing the sum by a factor of 1 plus CF1. CF1 is the relative increase in the high cardinality estimate from a lower level to the next higher level, and it is, for example, about one-eighth. As further described below, CF1 could be a function of the depth in the inverted tree. Execution then returns with the cardinality estimate for the directory. Moreover, by setting the factor CF1 to 0, then the subroutine of FIG. 9 will compute the true cardinality of the directory.

Figure 10:
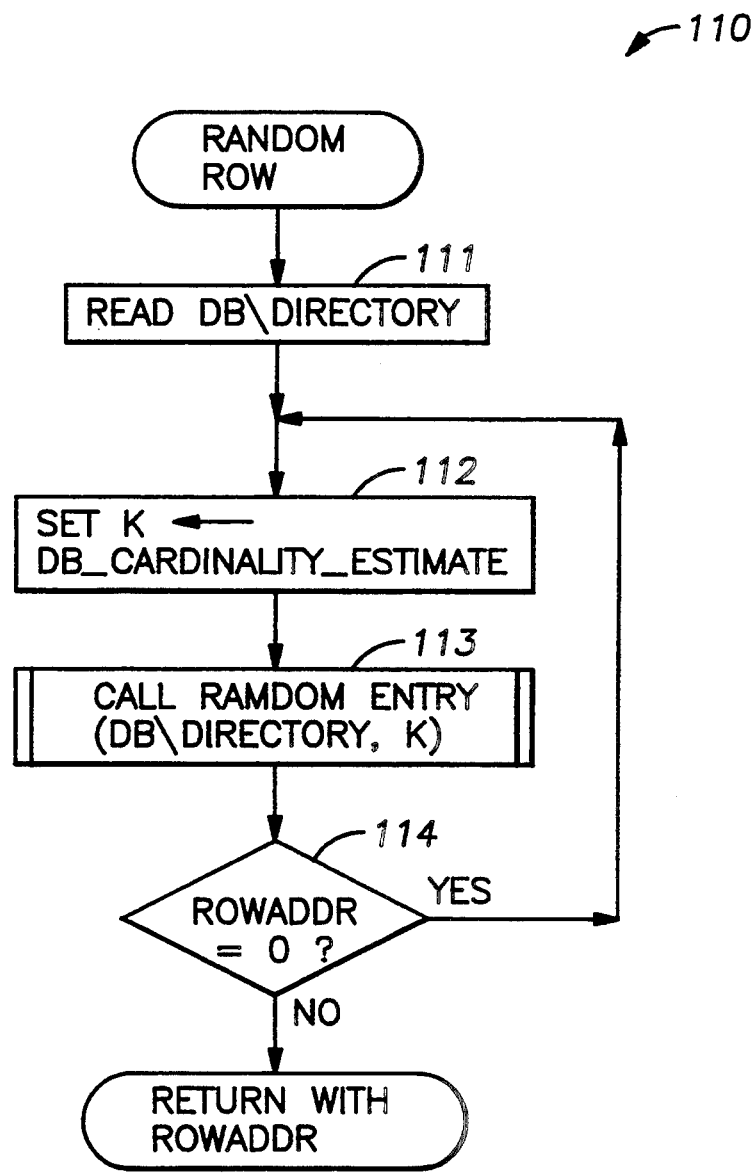
FIG. 10 is a flow chart of a subroutine for performing simple random sampling in accordance with the invention on a tree index.

Turning now to FIG. 10, there is shown a flow chart generally designated 110 of a subroutine for simple random sampling of a row from the hierarchical data structure of FIG. 4 and FIGS. 7A to 7O.

In the first step 111, the root directory (DB/DIRECTORY) is read from disk memory into random access memory. Then, in step 112, a variable K is set equal to the DB_CARDINALITY_ESTIMATE entry in the header of the root directory. Next, in step 113, a subroutine RANDOM ENTRY is called in order to select at random an entry that is a descendant of the specified root directory (DB DIRECTORY) using K as the range for a random selection of the children of the specified directory. Then, in step 114, execution loops back to step 112 if a returned ROWADDR parameter is equal to 0. If so, then at some point in the selection process, all children of a node were rejected during an acceptance/rejection selection, as further described below. If the parameter ROWADDR is not equal to 0, then execution returns with the row address of a row selected at random.

Figure 11:
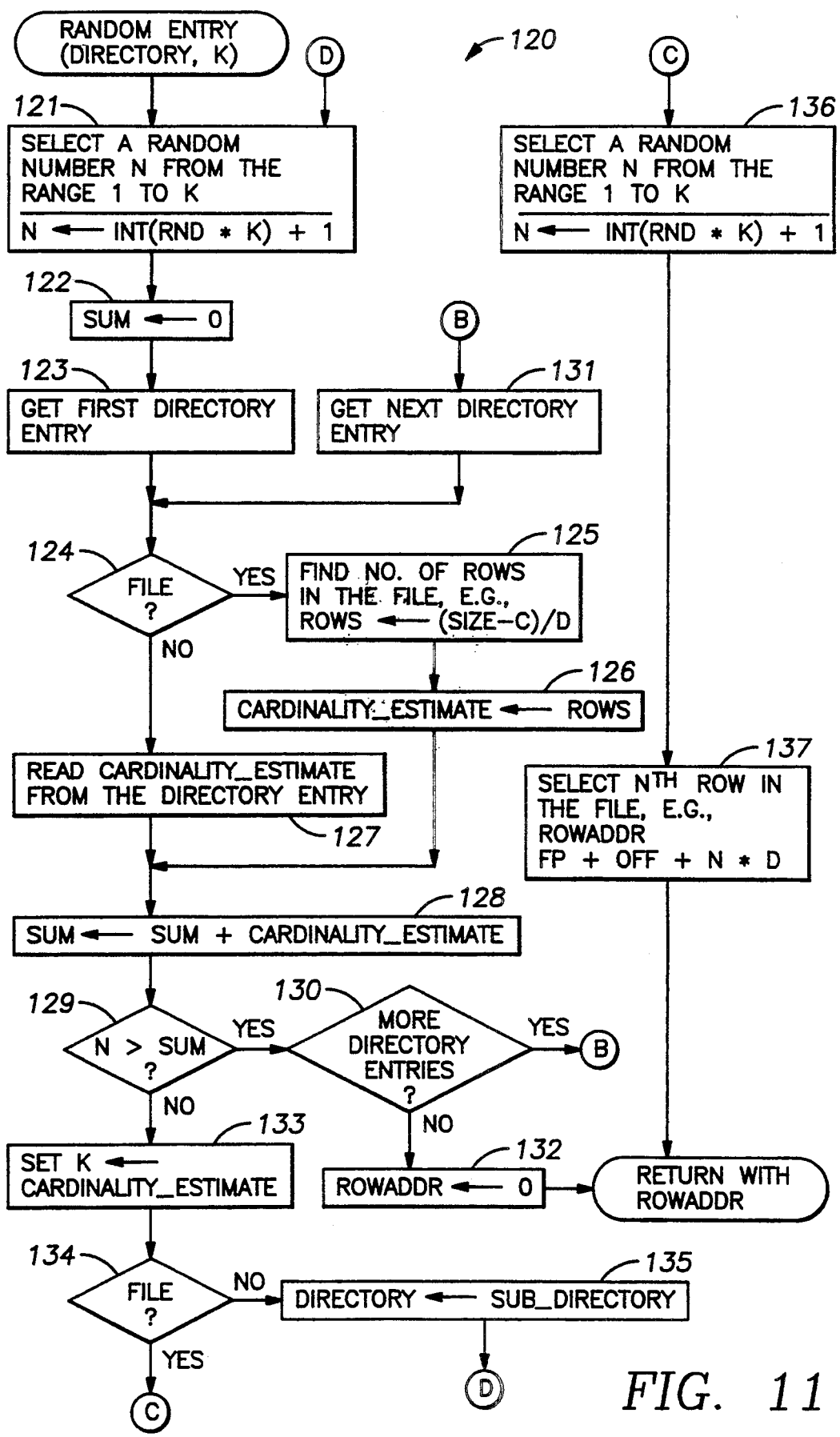
FIG. 11 is a flow chart of a subroutine for randomly selecting a row that is a descendant of a specified node or directory in the tree index.

Turning now to FIG. 11, there is shown a flow chart generally designated 120 of the subroutine RANDOM ENTRY for selecting at random one of the rows that are descendants of a specified directory, dependent upon a specified number K which sets the range for an acceptance/rejection selection in the specified directory. In a first step 121, a number N is selected at random within the range of 1 and the specified number K. This selection is made by a so-called random number generator function. The random number generator, for example, comprises a memory location holding a previously generated random number, and an indexed table of large prime numbers. The previously generated random number is multiplied by an indexed one of the prime numbers using a floating point multiply operation, and the table index is incremented. The mantissa from this floating point multiplication is a number greater or equal to 1 and less than 2. A random number RND greater than zero and less than one is obtained by clearing the exponent, and subtracting one in another floating point operation. Most high-level programming languages provide similar random number generators. In step 121, for example, the BASIC function RND is invoked, which returns a random number that is greater than 0 and less than 1. This random number RND is multiplied by the number K, the product is incremented by 1, and the sum is converted to an integer value by truncation of any fraction to provide the random number N.

In order to use the random N for an acceptance/rejection selection against a running sum of the cardinalities of the children in the specified directory, an accumulator variable SUM for the running sum is set to 0 in step 122. Then, in step 123, the first entry is obtained from the directory. If the entry is for a file, then in step 125, the number of rows in the file is obtained, for example, by computing the number of rows from the size of the file, assuming that each row has the same size. Then, in step 126, the cardinality estimate for the file is set equal to the number of rows in the file.

If step 124 finds that the directory entry is for a sub-directory instead of a file, then in step 127, the cardinality estimate for the sub-directory is read from the entry of the directory. Once the cardinality estimate is obtained for the file or sub-directory, then in step 128, the running sum is incremented by the cardinality estimate.

To perform the acceptance/rejection selection, in step 129, the random number N is compared to the value of the running sum. If the random number N is greater than the running sum, then execution branches to step 130 to check whether the directory has any more entries. If the directory has another entry, then execution branches to step 131 to get the next directory entry, which is processed in steps 124 to 129.

If it is found in step 130 that all of the directory entries have been processed, then the acceptance/rejection test has resulted in a rejection of all of the entries because the specified number K and the random number N happen to be greater than the sum of the cardinality estimates of all of the directory entries. When such a rejection occurs, the entire walk down the tree is rejected by setting the parameter ROWADDR to 0 in step 132, and execution returns.

If it is found in step 129 that the random number N is less than equal to the running sum, then execution continues to step 133, where the integer variable K is set equal to the cardinality estimate of the current directory entry. In other words, the acceptance/rejection selection has selected the current directory entry. In step 134, execution branches depending upon whether this current directory entry is a file. If it is not, then in step 135, the variable DIRECTORY is set to the pointer of the sub-directory in the current entry. Execution then loops back to step 121 to repeat the above-described operations upon the subdirectory.

If, in step 134, it was found that the entry was a file, then execution continues to step 136, where another random number N is selected from the range 1 to K. Next, in step 137, this random number N is used to select the Nth row in the file. For a file in which each row has the same length of D bytes, for example, the row address is computed as the sum of the file pointer, an offset related to the length of the header of the file, and the product of the number N and the constant D. Then execution returns with the row address.

Figure 12:
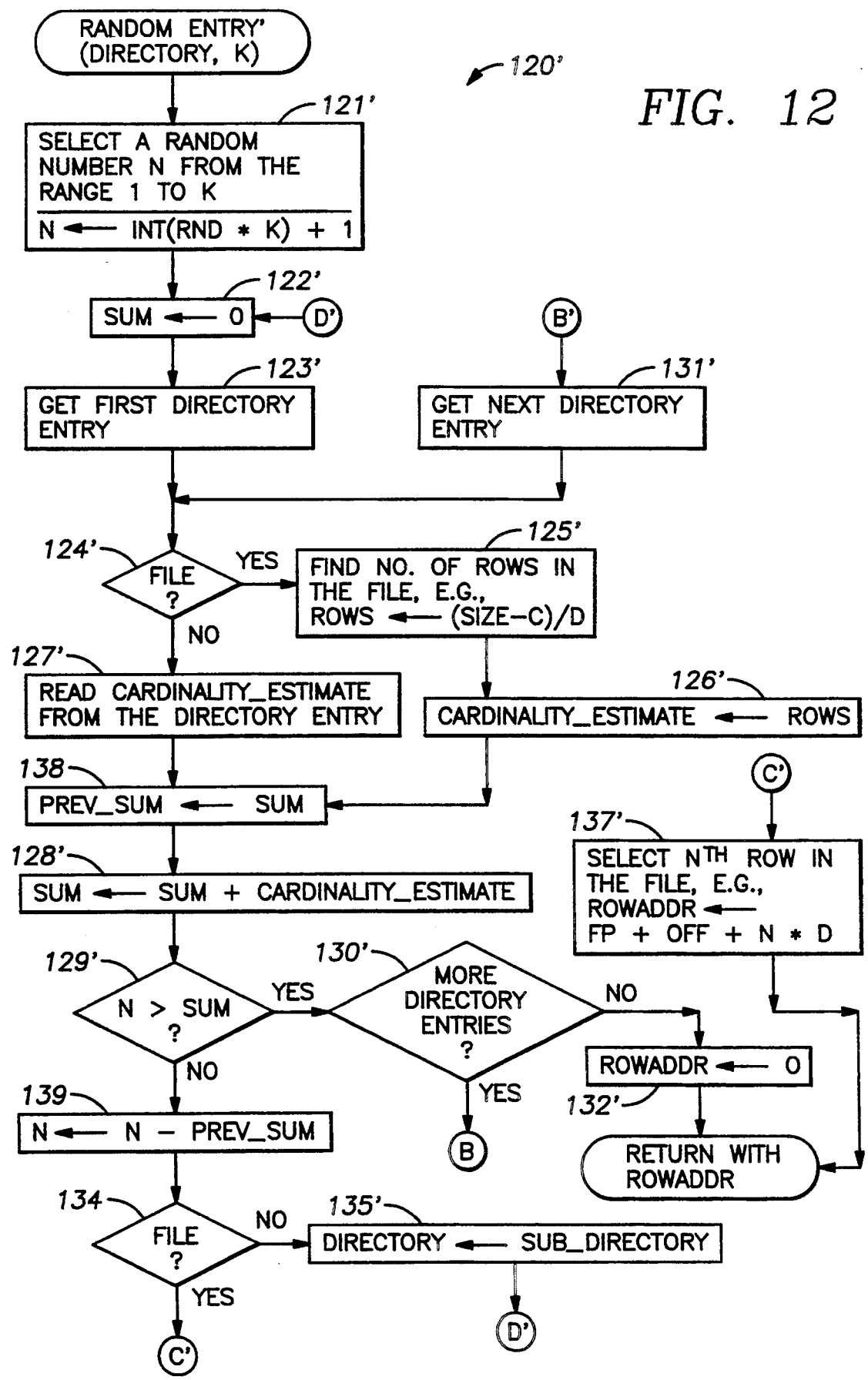
FIG. 12 is a flow chart of an improved version of the subroutine in FIG. 11, in which a random number for a selection at a next lower level in the tree index is obtained from a remnant of a random number used in the selection at a current level in the tree.

Turning now to FIG. 12, there is shown a flow chart 120' of an improved subroutine for selecting at random one of the rows that are descendants of a specified directory, dependent upon a specified number K which sets the range for an acceptance/rejection selection in the specified directory. The subroutine is similar to the subroutine 120 in FIG. 11, and similar steps are designated with similar but primed reference numerals. An improvement is made by calling the random number generator only once in the first step 121'.

A random number N for acceptance/rejection selection at a next lower level in the tree index is obtained in step 39 as a remnant of the random number used in the selection at the current level. In step 138, the value of the running sum is saved, in order to provide a value of the previous sum (PREV_SUM) for use in step 139. In step 139, the random number N is decremented by the previous sum (PREV_SUM) to provide a new random number N that is greater or equal to one and less than or equal to the cardinality estimate of the current directory entry. Although this new random number N is not independent of the previous value of the random number N, this new random number N is nevertheless uniformly distributed over the range of 1 to the cardinality estimate of the current directory entry. Therefore, it can be used for a random acceptance/rejection at the next lower level in the tree index.

Figure 13:
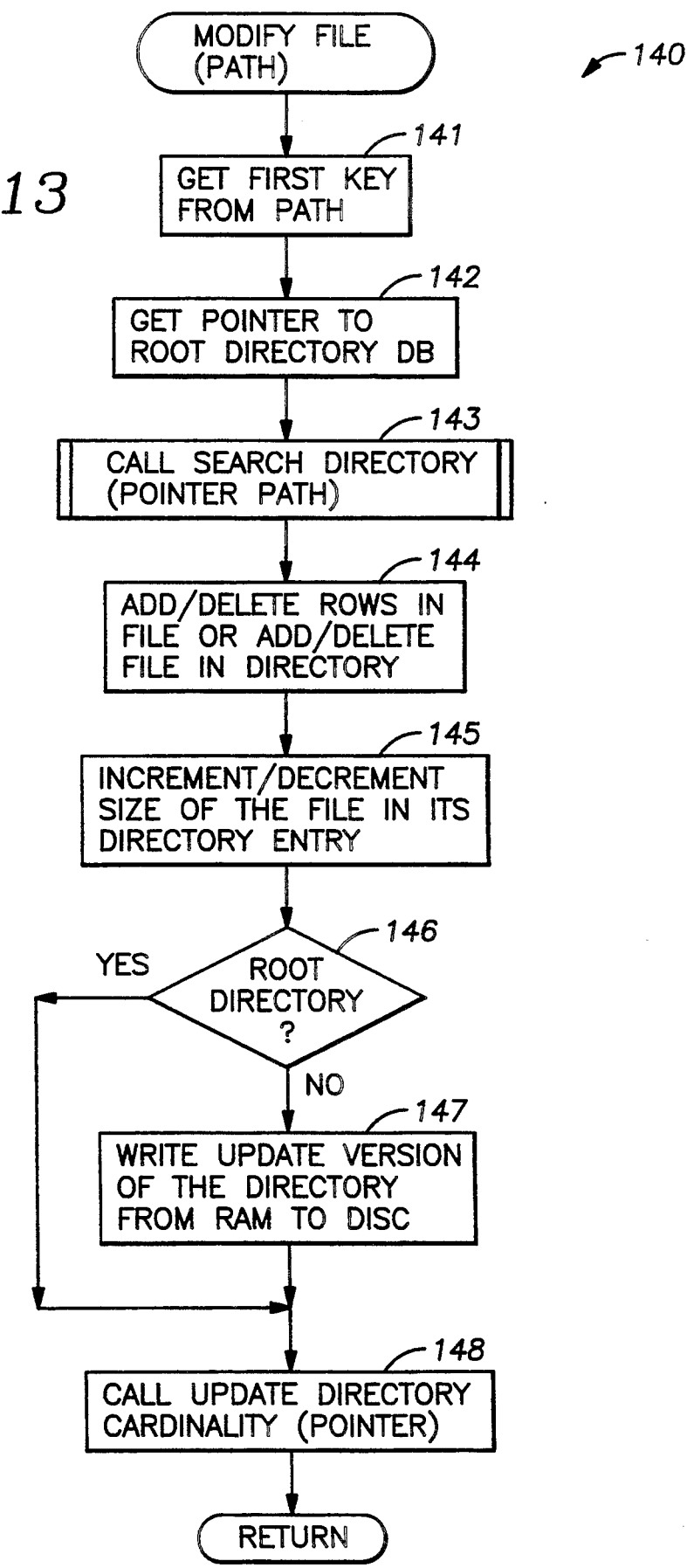
FIG. 13 is a flow chart of a subroutine for updating cardinality estimates in a tree index when a row or a file is added or deleted from memory.

Turning now to FIG. 13, there is shown a flow chart generally designated 140 of a subroutine for maintaining the cardinality estimates in the tree index when modifying a file having a specified path. In a first step 141, the first key is obtained from the path. Then, in step 142, a pointer to the root directory is obtained, for example, by searching a system directory of data bases or disk drives. Then, in step 143, a subroutine SEARCH DIRECTORY is called to obtain a pointer to the directory or file specified by the path, as further described below with reference to FIG. 14. Then, in step 144, specified rows of the file are added or deleted from the file or a specified file is added or deleted from the directory found in step 143. Next, in step 145, the size of the file is incremented or decremented corresponding to the number of rows added or deleted from the file, or the size of a new file is added to its directory entry. Then, in step 146, execution branches if the current directory is a root directory. If the current directory is not a root directory, then in step 147 the updated version of the directory of the file is written from random access memory to disk storage. If the current directory is a root directory, the updated version of the directory is not written from random access memory to disc storage until after its cardinality estimate is updated in its header. This is done in the final step 148, where a subroutine UPDATE DIRECTORY CARDINALITY is called to check whether a cardinality estimate for the directory should be updated, and if so, to update the cardinality estimate for the directory and escalate cardinality updating up the inverted tree.

Figure 14:
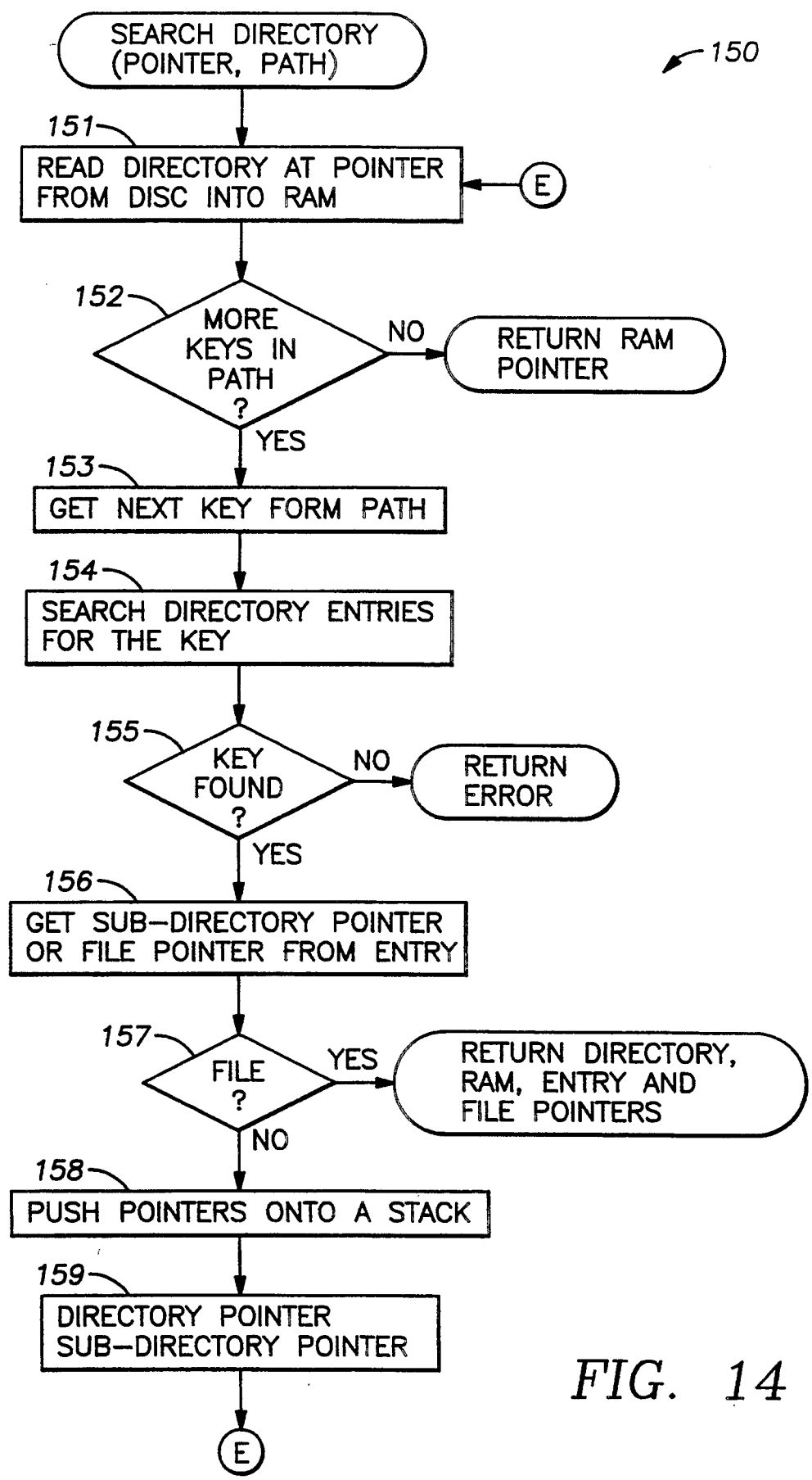
FIG. 14 is a flow chart of a subroutine for searching a specified tree index beginning at the root and searching downward along a path specified by a list of keys.

Turning now to FIG. 14, there is shown a flow chart generally designated 150 of the subroutine SEARCH DIRECTORY for searching directories along a specified path, beginning with a directory at a specified pointer. In a first step 151, the directory is read beginning at the pointer address from disk storage into a buffer in random access memory. Then, in step 152, execution branches depending upon whether there are more keys in the path. If not, then the search is finished and execution returns with a pointer to the buffer in random access memory holding the current directory. If there are more keys in the path, then in step 153, the next key is obtained from the path, and in step 154, the directory entries are searched for a matching key. In step 155, execution returns with an error message if a matching key is not found. Otherwise, in step 156, the sub-directory pointer or file pointer is obtained from the entry having the matching key. If the matching entry is for a file, then in step 157, execution returns with the pointers to the file, the entry in the current directory, the pointer to the RAM buffer including the current directory, and also with a stack of RAM buffer pointers and directory entry pointers for the path. If the directory entry having the matching key is not an entry for a file, then in step 158, the directory, RAM buffer, and directory entry pointers are pushed onto a stack. Then, in step 159, the directory pointer is set to the sub-directory pointer from the directory entry and execution loops back to step 151. Therefore, the search continues downward until the end of the path is reached.

Figure 15:
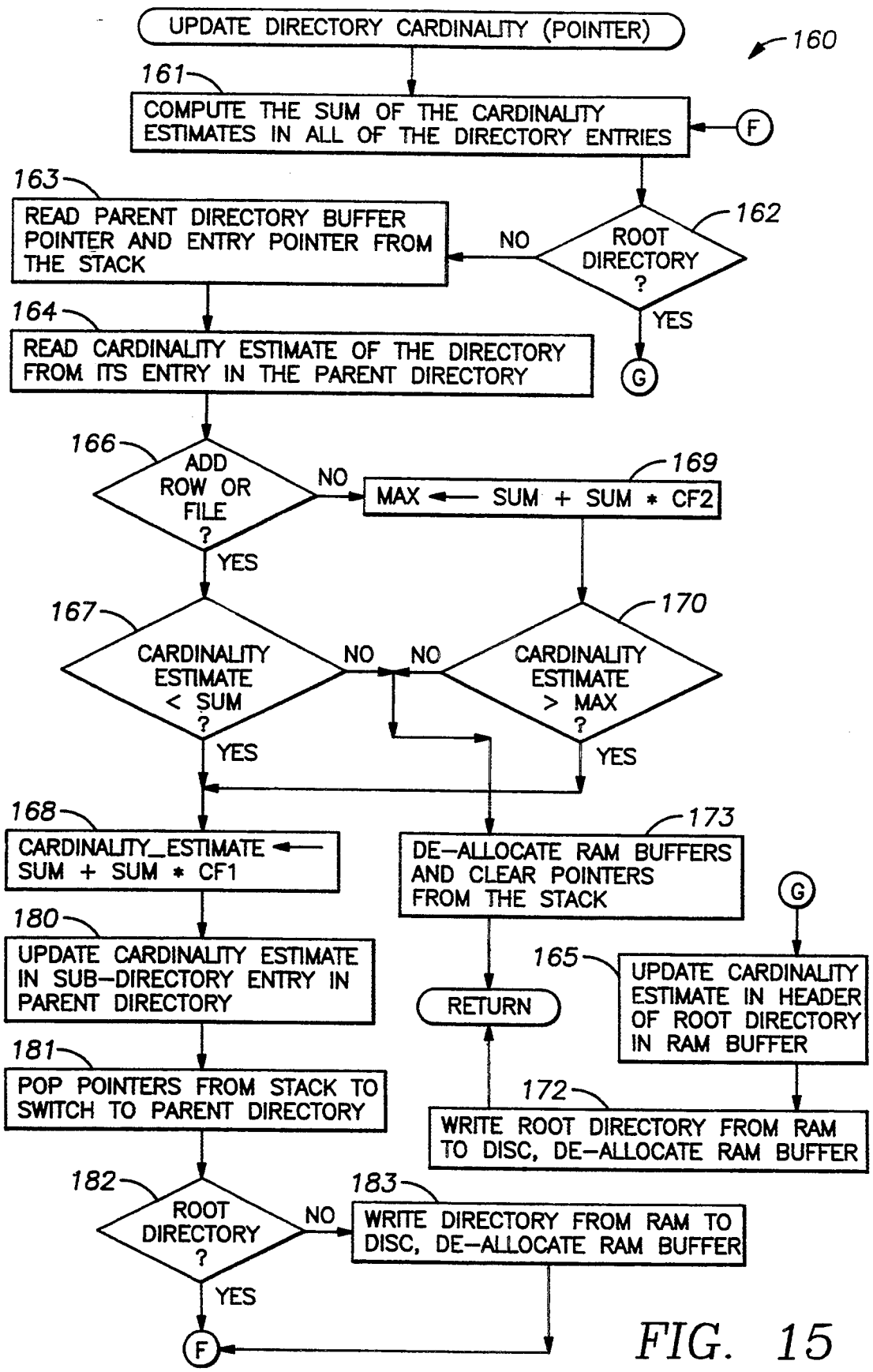
FIG. 15 is a flow chart of a subroutine for updating the cardinality of a directory and escalating the updating process up the tree toward the root.

Turning now to FIG. 15, there is shown a flow chart generally designated 160 of a subroutine UPDATE DIRECTORY CARDINALITY for updating the cardinality estimate for a specified directory, and, if necessary, escalating the process up the tree. In a first step 161, the sum of the cardinality estimates in all of the entries of the directory is computed. Then, in step 162, execution branches depending on whether the specified directory is a root directory. If not, then in step 163, the parent directory pointer and entry pointer are read from the stack, and then in step 164, the cardinality estimate of the current directory is read from its entry in its parent directory.

If step 162 determines that the current directory is a root directory, then there would be no I/O maintenance penalty in updating the cardinality estimate, because the root directory must be written from RAM to disc memory anyway to update the change in the cardinality of a file or subdirectory in the root directory. Therefore, in step 165 the cardinality of the root directory is updated in the header of the root directory. Then in step 172 the updated root directory is written from its RAM buffer to disc memory, the RAM buffer is de-allocated, and execution returns.

For the acceptance/rejection selection procedure described above to work properly, the high cardinality estimate of the directory must be greater or equal to the sum of the high cardinality estimates in all of the directory entries. Therefore, if the data base is modified by the addition of a row or file, as tested in step 166, then in step 167, the cardinality estimate of the current directory is compared to the sum. If the cardinality estimate is less than the sum, then in step 168, a new value of the cardinality estimate is computed from the sum.

If a row or file is deleted from the data base, then it is possible and may be desirable to decrease the cardinality estimate in order to make the random selection process more efficient. The random selection process will be more efficient if the cardinality estimate is greater than the sum by a certain relative factor CF2. Therefore, in step 169, a maximum limit is computed from the sum and a spread factor CF2. The spread factor CF2, for example, has twice the value of the factor CF1. The spread factor CF2 therefore sets the maximum spread of the high cardinality estimate with respect to the true cardinality, and the factor CF1 sets the mean spread of the high estimate of the cardinality with respect to the true cardinality. In situations where additions are more likely than deletions, the factor CF1 should be less than about half of the factor CF2. In situations where deletions are more likely than additions, the factor CF1 should be greater than half of CF2. In any case, the factor CF1 should not be greater than the factor CF2.

In step 170, the cardinality estimate is compared to the maximum limit. If the cardinality estimate is greater than the maximum limit, then execution continues in step 168 to update the cardinality estimate. Otherwise, if the cardinality estimate need not be updated, then in step 173, all of the RAM buffers holding directories are de-allocated and all of the pointers are cleared from the stack, and execution returns.

After the cardinality estimate is updated in step 168, then in step 180, the cardinality estimate of the current directory is updated in its sub-directory entry in its parent's directory in a RAM buffer indicated by a pointer in the stack. In step 181, the pointers are popped from the stack to switch the current directory to its parent directory. If this new current directory is not a root directory, as tested in step 182, then no further updates to the directory are needed. Therefore, in step 183, the directory is written from its RAM buffer to disk storage, and the buffer is de-allocated. Execution then loops back to step 161 to escalate the updating process up the tree. If the new current directory is a root directory, then execution also loops back to step 161 to compute an updated cardinality estimate in step 161, update the cardinality estimate in the root directory in RAM in step 165, and to write the updated root directory from RAM to disc storage in step 172.

In the preferred method of the invention, the sampling of any row or record is simple and unbiased because the likelihood of selecting any directory or file in the tree index is weighted by the cardinality estimate defined for each directory or file. This is evident from the following proof.

Let $CEST_{i,k}$ represent the cardinality estimate of the ith node at kth level of the tree. Let $P_{i,k}$ represent the probability of selecting the ith node at the kth level.

Assume that the jth node at the k+1th level is a child of the ith node at the kth level. Assume that whenever the ith node at the kth level is selected, then the "conditional probability" of selecting the jth node at the k+1th level is given by the ratio:

$$P_{i,k+1/i,k} = \frac{CEST_{m,k+1}}{CEST_{i,k}} \qquad \text{Equation 1}$$

By applying the definition of conditional probability, $$P_{j,k+1} = P_{i,k} \frac{CEST_{j,k+1}}{CEST_{i,k}} \qquad \text{Equation 2}$$

By recursive substitution of Equation 2 into itself for the variable $P_{i,k}$, the probability of selecting the jth node at the k+1th level is=

$$P_{j,k+1} = P_{Root} \left( \frac{CEST_{a,1}}{CEST_{Root}} \right) \left( \frac{CEST_{b,2}}{CEST_{a,1}} \right) \cdots \qquad \text{Equation 3}$$

$$\left( \frac{CEST_{i,k}}{CEST_{h,k-1}} \right) \left( \frac{CEST_{j,k+1}}{CEST_{i,k}} \right)$$

The denominator in each fraction is cancelled by the numerator in each preceding fraction, except that the denominator in the first fraction ($CEST_{Root}$) is not cancelled. Thus:

$$P_{j,k+1} = P_{Root} \left( \frac{CEST_{j,k+1}}{CEST_{Root}} \right) \qquad \text{Equation 4}$$

The random sampling will be simple and unbiased if each "leaf node" has the same probability of being selected, which will be true if each "leaf node" has the same CEST.

In the preferred embodiment of the invention, each record or row has a cardinality estimate of 1. Each row or record is included in a table or file, which is a "parent node" of the leaf nodes in the tree. When a table or file is selected during a walk down the tree, equation 1 is satisfied for the selection of a row or record given the selection of its table or file. To select a row or record in accordance with the preferred embodiment, a number N is selected at random from the range [1:K] where K is the number of rows or records in the table or file, so that the conditional probability of selecting any given row or record in the table or file is the reciprocal of the number of rows or records in the table or file. Equation 1 properly evaluates to this conditional probability because the cardinality estimate of any given row or record is always 1 and the cardinality estimate of any given table or file is always the number of rows or records in the table or file.

For an intermediate node which is not a table or file (i.e., a node which is a subdirectory), Equation 1 is satisfied by the acceptance/rejection sampling method of the preferred embodiment of the invention. The acceptance/rejection is based upon the cardinality estimate $CEST_{i,k}$ by selecting a number n at random within the range of 1 to $CEST_{i,k}$. Preferably, as shown in FIG. 12, the number n is the offset of a cascade of offsets of a random number selected at the root level. The number n is compared to a running sum of the cardinality estimates of the children $CEST_{j,k+1}$, to either select a particular child or to reject all of the children. So long as $CEST_{i,k}$ is greater or equal to the sum of $CEST_{j,k+1}$ for all of the children, the conditional probability is given by the ratio of the cardinality estimates, and Equation 1 is satisfied for each and every one of the children. Moreover, when all of the children of any node are rejected, the entire walk from the root is rejected so that the rejection at the node will not bias selections at any other nodes in the tree.

The preferred method of FIG. 12 can be seen to give simple and unbiased sampling by another proof based on the similarity of the preferred method to the method of random sampling on ranked trees. For every pseudo-ranked tree having high cardinality estimates $CEST_{i,k}$ such that each $CEST_{i,k}$ for a parent node is greater than or equal to the sum of the $CEST_{j,k+1}$ of the children of the parent, then the pseudo-ranked tree is a sub-tree of a certain ranked tree. For each node in the pseudo-ranked tree for which $CEST_{i,k}$ is greater than the sum of the $CEST_{j,k+1}$ of the children of the parent, the ranked tree has an additional child node having a $CEST_{m,k+1}$ that is the difference between $CEST_{i,k}$ and the sum of the $CEST_{j,k+1}$ of the children in the pseudo-ranked tree. Moreover, the ranked tree has a number of leaf nodes equal to the CEST of the root node. The procedure of FIG. 12, applied to the ranked tree, gives a one-to-one correspondence between each leaf node in the ranked tree and each possible random number N within [1:$CEST_{Root}$], so that selection of a leaf node in the ranked tree is simple and unbiased. When applied to the pseudo-ranked tree, the procedure of FIG. 12 gives a rejection for each random number N corresponding to a leaf node which is in the ranked tree but not in the pseudo-ranked tree. Every other possible random number N within [1:$CEST_{Root}$] corresponds to one and only one leaf node in the pseudo-ranked tree. Therefore, the preferred method of FIG. 12 gives a simple and unbiased sampling of the leaf nodes in the pseudo-ranked tree.

It is anticipated that the present invention will be particularly useful for providing a random selection feature in the query system of a relational database management system employing tree indices that are "B+ trees." "B+ trees" have the following four properties:

1) All entries are stored on leaf nodes. Each leaf node contains a number $\mu$ of entries.
2) All paths from the root to a leaf node have the same length.
3) All non-leaf nodes contain a number of elements: $p_0, r_1, p_2, \ldots, r_\mu, p_\mu$, where the $p_i$'s are pointers to immediate descendants of this node and the $r_i$'s are elements which can be compared with the keys in the entries. They are called reference keys. All keys in the subtree pointed to by $P_{i-1}$ are less than the reference key $r_i$, and all keys in the subtree pointed to by $p_i$ are greater than or equal to the reference key $r_i$.
4) The number $\mu$ referred to in 1 and 3, may vary from node to node, but satisfies $k \leq \mu \leq 2k$ for all nodes except for the root, where $1 \leq \mu \leq 2k$.

In practice, the restriction $k \leq \mu \leq 2k$ is either absent or is relaxed considerably. The relaxed bounds of $\mu$ create a main obstacle for applying the previously known methods of acceptance/rejection selection.

A working example of a query system and maintenance facility for B+ trees is given as Appendix I of the present specification. In this working example, medium cardinality estimates (CM), rather than the high cardinality estimates, are stored in association with the intermediate nodes of the tree, and the program of Appendix I computes the high cardinality estimate CEST for a node as:

$$CEST_k = CM_k * (1 + EPSILON_k) \quad \text{Equation 5}$$

The program also computes a low cardinality estimate:

$$CL_k = \frac{CM_k}{(1 + EPSILON'_k)} \quad \text{Equation 6}$$

The low cardinality estimate could be calculated from a value of $EPSILON'_k$ that is the same as or different from the value of $EPSILON_k$ used for calculating $CEST_k$. The spread factor $EPSILON_k$ is a function of the level of the node in the tree, and it should decrease or stay equal with increased depth in the tree. After an addition of one or more rows, the median cardinality estimate of a parent node might be too low. The program of Appendix I tests for this condition by computing an updated median cardinality estimate of the parent node as the sum of the updated median cardinality estimates of the children, multiplying this updated median cardinality by the factor $(1 + EPSILON_{k-1})$ to obtain a product that is the sum of the high cardinality estimates of all of the children of the node, computing the high cardinality estimate $CEST_k$ as the product of the previously stored median cardinality estimate $CM_k$ and the factor $(1 + EPSILON_k)$, and checking whether $CEST_k$ is less than the sum of the high cardinality estimates of the children (corresponding to step 167 in FIG. 14). If so, the stored median cardinality estimate for the parent node is set to its updated median cardinality.

After deletion of one or more rows, it might be desirable to update a median cardinality estimate that becomes too high and causes an unfavorably high rejection rate during acceptance/rejection selection. The program of Appendix I tests for this condition by computing an updated median cardinality of the node as the sum of the updated median cardinality estimates of the children, dividing this median cardinality by the factor $(1 + EPSILON'_{k+1})$ to obtain a quotient that is the sum of the low cardinality estimates of all of the children, computing the low cardinality estimate $CL_k$ as the quotient of the previously stored median cardinality estimate $CM_k$ and the dividend $(1 + EPSILON'_k)$ and checking whether the low cardinality estimate $CL_k$ is greater than the quotient (corresponding to step 170 in FIG. 14). If so, the stored median cardinality estimate for the node is set to the updated median cardinality estimate.

A comparison of the method of the flow charts to the method in the program of Appendix I shows that the two methods obtain the same result so long as the parameters CF1 and CF2 are functions of the depth k in the tree according to:

$$CF1_k = \left( \frac{1 + EPSILON_k}{1 + EPSILON_{k+1}} \right) - 1 \quad \text{Equation 7}$$

$$CF2_k = \left( \frac{1 + EPSILON_k}{1 + EPSILON_{k+1}} \right)\left( \frac{1 + EPSILON_{k'}}{1 + EPSILON_{k+1'}} \right) - 1 \quad \text{Equation 8}$$

For the case of EPSILON=EPSILON', then:

$$CF2 = 2*CF1 + CF1^2 \quad \text{Equation 9}$$

Preferably, $EPSILON_k > EPSILON'_k$ when additions to the database are more likely than deletions, and $EPSILON_k > EPSILON'_k$ when deletions are more likely than additions.

The program of Appendix I assumes that the spread factors $EPSILON_k = EPSILON'_k$ and:

$$EPSILON_k = \left( \prod_{i=0}^{P-k} (1 + A * Q^i) \right) - 1 \quad \text{Equation 10}$$

where k=1 for the root level, and k=P for the leaf level. The parameter A therefore is the spread of the cardinality estimate at the leaf level and the parameter Q is the degree of reduction of the spread going from one level to the next higher level. A value of Q=0.3 is generally preferred for B+ trees because the fanouts in practice are substantially higher than two. At the same time, for any k, $EPSILON_k$ never exceeds 2.13 so that the rejection rate is rather independent of the depth of the tree.

As illustrated by a comparison of the test program to the flow charts in the figures, it should be apparent to a person skilled in the art that the cardinality estimates serve as indications of approximate ranking information for each of the intermediate nodes in a tree index, and that approximate ranking information could be stored in memory in various alternative ways. Instead of storing high cardinality estimates as in the flow charts or storing median cardinality estimates as in the test program, for example, only low cardinality estimates could be stored and high cardinality estimates could be computed from the stored low cardinality estimates, or both high and low cardinality estimates could be stored, or ranks could be stored. A high cardinality estimate $CEST_{i,k}$, for example, could be computed from stored high rank estimates as:

$$CEST_{i,k} = RANK_{i,k} - RANK_{i-1,k} \qquad \text{Equation 11}$$

Stored rank estimates could be used to provide a binary search of within a node, for example instead of a comparison to a running sum during the acceptance/rejection selection of FIG. 12, or for key access to records having numerical keys assigned according to rank. As suggested by Equation 11, however, stored rank estimates would require multiple corrections during a cardinality update so that the stored rank estimates would be consistent. Therefore the storing of rank estimates would be a viable alternative only for unusual cases, such as where the rank estimates would be used for key access to records having numerical keys assigned in accordance with the rank estimates.

The program of Appendix I further takes into consideration a parameter F specifying a maximum fanout for the B+ tree. When it is known that the fanout of the tree cannot exceed a certain limit, and it is known that a tree has at most a depth of P levels, and assuming that the cardinality at the leaf level P is one, then the cardinality at level k cannot exceed $F^{}(P-k)$. Therefore, whenever the high cardinality estimate of a node is computed, it can be limited to $F^{}(P-k)$ so as to reduce the rejection rate when the computed high cardinality estimate would otherwise exceed the maximum $F^{**}(P-k)$.

The program of Appendix I was used in a series of experiments where tree indices were created by random insertions. These experiments showed that the cardinality maintenance parameters A=1 and Q=0.3 gave both very low reject rate (about 1) and very low update overhead (about 1%). Some of the results obtained with A=1 and Q=0.3 are summarized in table below. The table shows that the pseudo-ranked method of the present invention slashes the update overhead of maintenance I/Os substantially from about a 60 to 90% rate required for ranked sampling, and decreases the reject rate drastically, so that simple random sampling becomes a realistic task instead of unrealistic. Moreover, the pseudo-ranked reject rate stays stable for very different key compression distributions: with average fanouts changing from 11 to 43, the pseudo-ranked reject rate drops only by about 10%, whereas the non-ranked reject rate drops about 243 times.

The pseudo-ranked technique of the present invention is also fully adjustable. By decreasing the root-level spread parameter A down to zero, the extra I/Os and acceptance rates gradually shift and converge to the ranked B-tree case. By increasing the parameter A up to some high value, the pseudo-ranked sampling of the present invention gradually converges to the non-ranked case by reducing the extra I/O overhead to zero.

| No. Keys | P | F/Favg | Ranked Sampling | | Pseudo Ranked Sampling | | Non-Ranked Sampling | |
|---|---|---|---|---|---|---|---|---|
| | | | Update Overhead | Reject Rate | Update Overhead | Reject Rate | Update Overhead | Reject Rate |
| $1 \times 10^6$ | 6 | 30/11 | 80.79% | 0 | 0.90% | 0.950 | 0% | 1457.0 |
| $1 \times 10^6$ | 5 | 50/16 | 80.18% | 0 | 0.58% | 0.901 | 0% | 936.5 |
| $1 \times 10^6$ | 4 | 80/23 | 77.78% | 0 | 0.40% | 0.877 | 0% | 490.5 |
| 100,000 | 3 | 80/28 | 71.44% | 0 | 0.33% | 0.928 | 0% | 65.6 |
| 10,000 | 2 | 80/43 | 64.90% | 0 | 0.52% | 0.863 | 0% | 6.0 |

APPENDIX I.

/********************** : *********************************/

/*      Pseudo-Ranked B+ Tree Maintenance and Sampling Efficiency Measurement                    */
*/

/****************************************************************/
/*

Gennady Antoshenkov

Copyright © 1992 Digital Equipment Corporation

This program is a prototype for implementation of pseudo-ranked B+ trees that allow for efficient simple random sampling with only a small overhead paid during insert/delete tree maintenance operations.

The B+ trees are built and maintained in core. They contain no information related to the index keys. However, the tree shape is defined by the node fanouts and is fully controlled by (1) max/min fanouts not to be violated in any node and (2) low/high fanout limits depicting the area beyond which node split or merge will most probably take place. These four parameters cause the actual fanouts be distributed with a bell-shape probability density function, e.g.

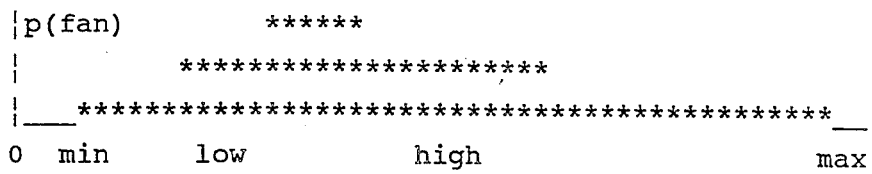

```
|p(fan)            ******
|             **********************
|___********************************************___
0  min       low            high                    max
```

WORKLOADS.

B+ tree maintenance procedure simulates a variety of workloads, all based on two atomic operations: insert and delete a single (ghost) key at a certain position. There are two "cursors" which specify a position: one for all inserts, another for all deletes. There are four flavors of atomic inserts and deletes:

INSERTS
   (a) Insert after the current insert cursor (ins_cur),
       then set the insert cursor to a newly inserted key.
   (b) Insert before ins_cur, then set ins_cur to a new key.
   (f) Do (a) or (b) interchangeably - flip-flop insert.
   (r) Insert at random position, ins_cur is not affected.

DELETES
   (a) Delete a key at del_cur, then set del_cur after the gap.
   (b) Delete a key at del_cur, then set del_cur before the gap.
   (f) Do (a) or (b) interchangeably - flip-flop delete.
   (r) Delete a key at random position, del_cur is not affected.

The workload is specified by a series of requests, each request is an input line starting with "R". One request specifies n iterations of insert/delete sequences. One insert/delete sequence can contain:

several inserts of one of the type (a), (b), or (f) followed by
   several inserts of type (r)                                       followed by
   several deletes of one of the type (a), (b), or (f) followed by
   several deletes of type (r)

where the number of inserts/deletes of each type can be zero, one, or more. For example, the request line R1000 i5a1000000 i2r d2b0 dr applied to the empty B+ tree, will request a sequence of 5 inserts at the end of the index, 2 random inserts,
   2 deletes at the beginning of the index, 1 random delete, repeated 1000 times. In other words, it simulates a workload of 70% inserts mixed with 30% deletes with index grown up to 4000 keys having a major incoming key flow at the end, some trimming flow at the beginning, and some random additions and removals spread across the entire index.

B+ TREE.

B+ tree shape changes by
   1) splitting the node if node overflow condition is detected,
   2) merging or rebalancing the two neighboring nodes upon underflow.

Different overflow/underflow conditions can be specified by entering a "set parameters" input line which starts with "S". All major tree balancing algorithms can be set by four "degree" parameters: max, min, low, and high.

Case 1: Fanout balance upon overflow, no merge upon underflow.

e.g. line

S d50:1 sets max=high=50, min=low=1. It splits the node if an insert creates an "overflown" node with fanout=51, it never merges nodes, but prunes a single-thread branch if a delete creates a node with fanout=0.

Case 2: Fanout balance upon overflow and underflow.

e.g. line

S d70:25 sets max=high=70, min=low=25, line

S d70 sets max=high=70, min=low=35. It splits the node only if an insert creates a fanout=71 node, it merges or rebalances two neighboring nodes only if a delete creates a fanout=24 (or fanout=34) node.

Case 3: Space balance simulation.

e.g. line

S d80:6(20:10)

sets max=80, high=20, low=10, min=6.

Splits and merges are based on some random coefficients simulating an index key compression which are stored in B+ tree nodes. Splits occur upon inserts creating a node with fan between 21 and 81. Merges/rebalance occur upon deletes delivering fan between 5 and 9.

PSEUDO-RANKED B+ TREES.

The pseudo-ranked B+ tree shape depends only on max/high/low/min parameters and on a particular workload. The approximate rank information (i.e., cardinality estimates), stored in the non-leaf nodes, has no bearing on a tree shape. Approximate ranks are used to improve performance of a variety of estimates made via the B+ tree indexes.

The rank-related information, stored in nodes (and referred in this program as inode->br[branch].rank), is in fact not a rank, but an approximate cardinality of the node's branch. Maintenance of the approximate cardinalities is controlled by three parameters A, Q, and F, where A defines the spread at the root node of the tree, Q defines the change in spread between the levels of the tree, and F defines the maximum fanout of any node in the tree.

A "set" input line

```
S e120%40% f90
``` would set A=1.2, Q=0.4, F=90.

Setting of max/high/low/min and A,Q,F parameters can be mixed in one input line. An "S" line kills the previously created B+ tree and changes the values of "d", or "e" or "f" parameters whichever are specified, non-specified parameters remain unchanged.

During experiments, it is often needed to rebuild precisely the same tree several times changing only the A,Q,F parameters. To do this, the same workload lines ("R" lines) should be repeated several times preceded by different "S" lines, all containing a letter "x". The meaning of "x" is to reset a random number seed to some initial value, thus making a B+ tree build a deterministic operation (opposite to stochastic tree built which would be the case if "x" is omitted from "S" line).

For example,

```
S d80:6(20:10)
S x e25%40%f90
R100000ir
S x e100%
R100000ir
``` will build two identical B+ trees with pseudo-ranked information created under control of two different parameter sets:

A=0.25, Q=0.4, F=90   and   A=1, Q=0.4, F=90.

SAMPLING EFFICIENCY.

While a B+ tree is being built by some request sequence, you can observe the most important tree parameters, including sampling efficiency, by looking at two output lines printed after each request line. For example, by doing a million of random inserts we create a pseudo-ranked tree with the following characteristics:

> S x d30:4(12:6) e100%30%
> R1000000 ir
BoundIOs=56506  UpdIOs=6250280  Ratio=0.90%
Card=1000000 Lev=6  Fan:lim=30,max=30,avg=10.74  Ratio: 1457.00000:0.94972

Here

Card=1000000      - tree cardinality (number of keys) is 1 million,
Lev=6             - root level of the tree (same as tree height) is 6,
Fan:lim=30,       - max possible fanout set by "S x d30 ...",
    max=30,       - actual maximum fanout among all B+ tree nodes,
    avg=10.74     - actual average fanout among all B+ tree nodes,
Ratio: 1457.00000 - rejection rate of sampling by Olken & Rotem,
      :0.94972    - rejection rate of sampling by using pseudo rank info.

BoundIOs=56506    - extra I/Os for maintaining pseudo-rank information,
UpdIOs=6250280    - regular I/Os needed for building this B+ tree,
Ratio=0.90%       - update overhead:  0.90% = 0.009 = 56506/6250280.

In the following example we set A=0 and Q=0 (...e0%0%) to simulate a fully-ranked B+ tree. Usage of "x" in (S x ...)

guaranties the same tree built as in the previous example.

```
> S x d30:4(12:6) e0%0%
> R1000000 ir
BoundIOs=5049690  UpdIOs=6250280  Ratio=80.79%
Card=1000000 Lev=6  Fan:lim=30,max=30,avg=10.74  Ratio:
1457.00000:0.00000
```

Interesting points are:
The fully-ranked rejection rate is 0  (... Ratio: ... :0.00000).
The update overhead is 80.79% - this is why we need this run - it allows comparison of the previous update overhead of 0.9% with the maximum overhead of 80.79%.

OTHER PROGRAM FEATURES.

1. The whole B+ tree can be printed by entering ':' line.

2. The entire script to run can be stored in a text file (e.g. TEXT.B) and then executed by entering "@TEXT.B" input line. Stored commands invocation can be intermixed with direct input line commands ad libitum.

3. A log of any portion of a session can be routed to a text file (in addition to printing it on a screen) by:

```
    $TEST.LOG
    . . . . . . . . . . . . . .
    any commands and their output
    . . . . . . . . . . . . . .
    $
```

The log will be put in TEST.LOG (or any other name) file. The log production will be terminated by "$" input line.

4. In each line a portion of text to the right of "!" is considered a comment.

5. A session can be terminated by entering a "." line.
*/

```
/******************************************************/
/**                    SYNTAX CHART
    **/
/*
Notations:   #      - some integer number
             <par>  - number corresponding to some parameter  par
             [text]      - text inside brackets is optional (can be omitted)
             {t1|t2|etc.} - exactly one of the choices t1,t2,... is used
             item...     - item is repeated one or more times
Blanks can be inserted or absent between any tokens.
Comments start from "!" to the end of the line.
```

---

```
S [x] [d#[:#][(#[:#])]] [e#%[#%]] [f[#]]        !"Set" input line
    x    - initializes a random seed (for consistent tree build
           repeat)
    d<max>              - defaults: <min>=<max>/2, <high>=<max>, <low>=<min>
    d<max>:<min>                - defaults: <high>=<max>, <low>=<min>
    d<max>:<min>(<high>)        - default: <low>=<high>/2
    d<max>:<min>(<high>:<low>)
    e<A>%               - default: <Q>=50%
    e<A>%<Q>%
    f                   - default: <F>=<max>
    f<F>
```

---

```
R[#] {{i|d}[#] {a[#]|b[#]|f[#]|r}}...        !"Request" input line
                                             !all [#] default to 1 if absent
    R#   - repeats the following insert/delete sequence # times
    i#   - inserts # (ghost) keys
    d#   - deletes # (ghost) keys
    a#   - inserts after ins_cur, places ins_cur at the new key  or
           deletes at del_cur, places del_cur after the gap
    b#   - same as a#, but "before"
    f#   - flip-flops "after" and "before"
    r    - inserts/deletes at a random position, ins_cur/del_cur are
           unchanged
```

---

```
P                !"Print" input line - prints the entire B+ tree
```

---

```
@<file_name>    !executes input lines from <file_name> file
```

```
$<file_name>    !starts copying input and print to <file_name>
file
$               !stops copying input and print to a file
```

---

```
.               !exits the program
*/
```

/* MACHINE DEPENDENCIES

The following "C" language program runs on a VAX (trademark) digital computer manufactured and sold by Digital Equipment Corporation. To run the program on a different computer, the following changes might be needed:

1. Verify and change, if necessary, the definitions
   ```
   #define UBYTE unsigned char  /*must be 8 bit unsigned number*/
   #define SWORD          short /*must be 16 bit signed number*/
   #define ULONG unsigned long  /*must be 32 bit unsigned number*/
   #define SLONG          long  /*must be 32 bit signed number*/
   ```

2. In the statement
   ```
   #define GHV 1e50
   ```
   make sure it is taken by a compiler, you can reduce it if necessary.

3. In the statement
   ```
   #define POOL_B_SIZE 12500000
   ```
   you will be forced to lower it, because this is a major piece of storage expressed in bytes which must be available on your PC.

4. The following declarations
   ```
   struct dbl_ {union  {double g;
                        SLONG  i[2]; }u; };
   struct dbl_ DblS;
   struct dbl_ Dbl1;
   double      DblC63;
   #define LRAND (..... )
   ```
   are needed only for supporting a random number generator.
   You may use whatever random number generator is available on your PC. This would involve the following changes:

a. Remove the DblS, Dbl1, DblC63, and dbl_ declarations.
   b. Replace LRAND definition with its PC version.

c. Rewrite a tiny
    init_seed ()
    routine to initialize the seed of a random number
    generator always to the same value.
*/

```c
#include <stdio.h>
#include <math.h>

/*****************************************************/
#define UBYTE unsigned char
#define SWORD          short
#define ULONG unsigned long
#define SLONG          long
#define TRUE  1
#define FALSE 0
#define MIN(x,y) (((x)<=(y))?(x):(y))
#define MAX(x,y) (((x)>=(y))?(x):(y))
#define ABS(x) (((x)>=0)?(x):-(x))
SLONG  Zero_to_abort=0;
define ABORT Zero_to_abort=1/Zero_to_abort define PRF(s) {printf(s); if (OutF!=NULL) fprintf(OutF,s);}
define PRF1(s,a) {printf(s,a); if (OutF!=NULL) fprintf(OutF,s,a);}
#define PRF2(s,a,b) {printf(s,a,b); if (OutF!=NULL) fprintf(OutF,s,a,b);}
#define PRF3(s,a,b,c) {printf(s,a,b,c); if (OutF!=NULL) fprintf(OutF,s,a,b,c);}
#define PRF4(s,a,b,c,d) {printf(s,a,b,c,d); if (OutF!=NULL) fprintf(OutF,s,a,b,c,d);}
#define PRF5(s,a,b,c,d,e) {printf(s,a,b,c,d,e); if (OutF!=NULL) fprintf(OutF,s,a,b,c,d,e);}

/*****************************************************/
#define HV 100000000    /*High Value*/
#define NV 0x7FFFFFFF   /*Null Value*/
#define M10 10000000
define GHV 1e50        /*G_float High Value*/ define SSIZE 99
UBYTE  S[SSIZE];    /*input buffer*/
SLONG  SLen;        /*length of text in S*/
```

```
SLONG   SPos;        /*current position in S*/
UBYTE   TokenPos;    /*position of the last processed token in S*/

/*****************************************************/
#define POOL_B_SIZE 12500000
SLONG   PoolBSize;
UBYTE   *Pool;
UBYTE   BigPool[POOL_B_SIZE];

struct req_ {SLONG   count;
            SLONG   ins_point;
            SLONG   ins_point_quant;
            SLONG   ins_rand_quant;
            SLONG   ins_point_advance; /*1: inserts after, 0:
inserts before*/
            SLONG   ins_point_flip;    /*if 1, makes point_adv
seq 1,0,1,0...*/
            SLONG   del_point;
            SLONG   del_point_quant;
            SLONG   del_rand_quant;
            SLONG   del_point_advance; /*1: next delete is after,
0 - before*/
            SLONG   del_point_flip;    /*if 1, makes point_adv
seq 1,0,1,0...*/
                    /*fields above are initialized at each new
request*/
            SLONG   req_iter;
            SLONG   quant_iter;
            UBYTE   *quant_type;

SLONG   upd_count;
            SLONG   eps_count;
            SLONG   eps_count_during_update;
            SLONG   io_count;
        } Req,ReqX;

#define DEGREE_LIM 200
struct node_ {SLONG   count;
             SLONG   card;
             float   rank; /*sum of br[] ranks*/
             struct {union {struct node_ *node;
                            SLONG   card;} u;
```

```
                float   rank;
                SWORD   efan;
                SWORD   degs;
                } br[DEGREE_LIM+1];
        }Node;

#define DEPTH_LIM 100
struct path_ {SLONG  root_lev;
              SWORD  root_degs;
              SWORD                          dummy1;
              SLONG  card;
              struct {struct node_ *node;
                      SLONG  branch;
                          /*from 0 thru node->count-1*/

SLONG  card;
                      float  epsilon;
                      double pepsi;
                          /* (1+epsilon)(1+epsilon*eps1)... */
                      double pfan;      /* fan_bound**h */
                      } lev[DEPTH_LIM+1];
        }Path;

struct top_ {SLONG  min_degree;
             SLONG  max_degree;
             SLONG  lo_degree;
             SLONG  hi_degree;
             SLONG  fan_bound;  /* >=max_degree */
             float  sigma;
                 /*equiv. of standard deviation of fan distrib.*/
             float  epsilon;
               /*when a deviation of fan >= epsilon, update fan*/
             float  eps1;
               /*epsilon(levI+1)=epsilon(levI)*eps1  /
               /*_____above quantities can be set bu the user*/

SLONG  node_bsize;
             struct node_ *free_pool_node;  /*address in pool*/
             struct node_ *free_node_list;  /*address in pool*/
             } Top = {2,4,2,4,4,0.5,HV,0.5, 0,NULL,NULL},
               TopX;
double HashConst1,HashConst2;
```

```c
#define DEG_SZ 100
SLONG   LoDegs[DEG_SZ*2+1];
SLONG   HiDegs[DEG_SZ*2+1];
        /* x is a random value between 0 and 1 */
        /* s is sigma (equivalent of fan's standard deviation) */
#define DISTR(x,s)
((SLONG)((DEG_SZ*(s<0.001)?1:(1+s*(s+1)/(s+x)+s*(s+1)/(s+1-x)))+0
.4999))

/***/
struct dbl_ {union {double g;
                    SLONG  i[2];}u; };
struct dbl_ DblS;
struct dbl_ Dbl1;
double      DblC63;

#define LRAND
(DblS.u.i[0]=Dbl1.u.i[0],DblS.u.g*=DblC63,DblS.u.i[1]&0x7fffffff)

#define DRAND()    ((double)(LRAND%1111111)/1111111)

double infrac();
FILE *fopen(), *InF, *OutF;

/*************************************************************/
/*** Test B-tree - main routine                          ***/
main () {
    SLONG i,j,n; UBYTE c,cc;

/*??
    {double f,y,z;
    f=exp(1/((double)14.0)*log(M10));

for (z=(-5); z<=0; z+=0.25) {double x,s;
        x=exp(-z*z/2)/2;
        printf("%.5f: ",(float)x);
        for (s=1/(double)M10,j=0; j<=14; j++,s*=f) {
            n=bell(x,s);
            printf(" %3d",n);}
        printf("\n");
        }
    }
*/
```

```
    init_seed();
    HashConst1=sqrt(2.0); HashConst2=exp(1.0);

Path.root_lev=0;
    PoolBSize=check_space();
    Pool=BigPool; /*?? Pool=alloc(PoolBSize);*/
    Top.free_pool_node=Pool;
    Top.node_bsize=         /*one extra (temporary) entry for
insertions*/
        (ULONG)(&Node.br[Top.max_degree+1])-(ULONG)(&Node);
    PRF1("Enter dot to finish.  Pool size: %d bytes\n",PoolBSize);
    if (PoolBSize==0 || Pool==NULL)
        {PRF("*** Failed to allocate pool\n"); return;}
    init_req();
    while (TRUE) {
        inline("> "); TokenPos=1;
        if (S[0]==0) continue;
        switch (S[0]) {
        case '.': if (S[1]==0) return; goto syn_err;
        case '@':   /*Take input from a file*/
            InF=fopen(&S[1],"r");
            if (InF==NULL) goto syn_err;
            break;
        case '$':   /*Copy output to a file*/
            if (S[1]==0) {if (OutF!=NULL) {close(OutF); OutF=NULL;}
break;}
            if (S[1]=='$') {OutF=fopen(&S[2],"a"); TokenPos=2;}
            else            OutF=fopen(&S[1],"w");
            if (OutF==NULL) goto syn_err;
            break;
        case 'S':   /*Set top parameters*/
            {SLONG fan_already_set=0;
             SLONG initialize_seed=0;
            copy_top(&Top,&TopX);
            SPos++;
            while ((c=inchar())!=0)
                switch (c) {
                case 'x': {initialize_seed=1; break;}
                case 'd': {
                    if ((TopX.max_degree=inint())>DEGREE_LIM) goto
                        syn_err;
                    if (fan_already_set) {
```

```
            if (TopX.max_degree>TopX.fan_bound) goto
                syn_err;}
        else TopX.fan_bound=TopX.max_degree;
        fan_already_set=0;

if ((cc=inchar())==':') {
            TopX.min_degree=inint();
            if (TopX.min_degree==NV)
TopX.min_degree=TopX.max_degree/2;
            cc=inchar();}
        else TopX.min_degree=TopX.max_degree/2;
        if (TopX.min_degree<=0 ||
            TopX.min_degree>TopX.max_degree/2) goto
                syn_err;
        if (cc!='(') {
            TopX.hi_degree=TopX.max_degree;
            TopX.lo_degree=TopX.min_degree;
            SPos=TokenPos;
            break;} if ((TopX.hi_degree=inint())>TopX.max_degree) goto
            syn_err;
        if ((cc=inchar())==':') {
            TopX.lo_degree=inint();
            if (TopX.lo_degree==NV)
TopX.lo_degree=TopX.hi_degree/2;
            cc=inchar();}
        else TopX.lo_degree=TopX.hi_degree/2;
        if (TopX.lo_degree<TopX.min_degree ||
            TopX.lo_degree>TopX.hi_degree/2) goto syn_err;
        if (cc!=')') goto syn_err;
        break;
        }
    case 's': {double sig;
        TopX.sigma=0.0;
        sig=infrac();
        if (sig<(-1)) goto syn_err;
        if (sig<0) break;
        TopX.sigma=sig;
        break;
        }
    case 'e': {SLONG eps;
```

```c
                TopX.epsilon=HV;
                eps=inint();
                if (eps==NV) break;
                if (inchar()!='%') goto syn_err;
                TopX.epsilon=(double)eps/100;
                TopX.eps1=0.5;
                eps=inint();
                if (eps==NV) break;
                if (inchar()!='%') goto syn_err;
                TopX.eps1=(double)eps/100;
                break;
                }
            case 'f': {SLONG fan;   /*set fanout bound*/
                fan_already_set=1;
                fan=inint();
                if (fan==NV) {TopX.fan_bound=TopX.max_degree;
                    break;}
                if (fan<TopX.max_degree) goto syn_err;
                TopX.fan_bound=fan;
                break;
                }
            default: goto syn_err;
            }
        copy_top(&TopX,&Top); /*success*/
        Top.node_bsize=
                /*one extra (temporary) entry for insertions*/
            (ULONG)(&Node.br[Top.max_degree+1])-(ULONG)(&Node);
        Top.free_pool_node=Pool;
        Top.free_node_list=NULL;
        if (initialize_seed) init_seed();
        init_req();      /*initialize request*/
        Path.root_lev=0;  /*empty tree indicator*/
        break;
        }
case 'R':  /*Request*/
SPos++;
copy_req(&Req,&ReqX);
if ((ReqX.count=inint())==NV) ReqX.count=1;
if (S[SPos]!=0) {
    ReqX.ins_point_quant=0;
    ReqX.ins_rand_quant=0;
```

```
            ReqX.ins_point_advance=1;
            ReqX.del_point_quant=0;
            ReqX.del_rand_quant=0;
            }
        while ((c=inchar())!=0)
            switch (c) {
            case 'i': {
                if ((i=inint())==NV) i=1;
                if ((cc=inchar())=='a' || cc=='b' || cc=='f') {
                    ReqX.ins_point_quant=i;
                    if ((j=inint())!=NV) ReqX.ins_point=j;
                    ReqX.ins_point_advance=1;
                    if (cc=='b') ReqX.ins_point_advance=0;
                    ReqX.ins_point_flip=0;
                    if (cc=='f') ReqX.ins_point_flip=1;}
                else
                if (cc=='r') ReqX.ins_rand_quant=i;
                else goto syn_err;
                break;
                }
            case 'd': {
                if ((i=inint())==NV) i=1;
                if ((cc=inchar())=='a' || cc=='b' || cc=='f') {
                    ReqX.del_point_quant=i;
                    if ((j=inint())!=NV) ReqX.del_point=j;
                    ReqX.del_point_advance=1;
                    if (cc=='b') ReqX.del_point_advance=0;
                    ReqX.del_point_flip=0;
                    if (cc=='f') ReqX.del_point_flip=1;} else
                if (cc=='r') ReqX.del_rand_quant=i;
                else goto syn_err;
                break;
                }
            default: goto syn_err;
            }
        copy_req(&ReqX,&Req);
        request();
        break;
    case 'P':   /*Print*/
        SPos++;
```

```
            if (S[SPos]!=0) goto syn_err;  /*?? enhance later*/
            print_btree();
            break;
      case 'D':  /*Display approximate rank differences*/
            SPos++;
            if (S[SPos]!=0) goto syn_err;  /*?? enhance later*/
            display();
            break;
      default: TokenPos=0; goto syn_err;
      }
      continue;
syn_err:
      PRF1("*** Syntax error at |%s|\n",&S[TokenPos]);
      };
}

/********************************************************/
/*** Input Line.  Delivers line into S[], sets SLen,... */
inline (s) char *s; {
    SLONG k,q;
inp:  if (InF==NULL) PRF1("%s",s);

for (k=0; (S[k]=getc((InF!=NULL)?InF:stdin))!='\n'; ) {
          if (S[k]==255 && InF!=NULL) {close(InF); InF=NULL; goto
                inp;} if (S[k]==255) {S[0]='.'; S[1]=0; SPos=0; SLen=1;
                return;} /*"Exit"*/
          if (S[0]!=' ' && k<SSIZE) k++;}
      q=(k<SSIZE)-1;
      while (k--, k>=0 && S[k]==' ') ;
      S[++k]=0; SLen=k; SPos=0;
      if (q) {PRF("***Line too long\n"); goto inp;}
      if (InF!=NULL) PRF1(">>%s\n",S)
      else if (OutF!=NULL) fprintf(OutF,"%s\n",S);
       for (k=0; S[k]!=0 && S[k]!='!'; k++) ; S[k]=0; SLen=k;
/*!comment*/
}

/********************************************************/
/*** Input Integer.  Returns:   NV      if no integer   */
                            /*  HV      if overflows HV */
```

```c
inint () {                      /* integer otherwise           */
   SLONG k,kk,x;
   UBYTE c;
   k=SPos; while ((c=S[k])==' ') k++;
   TokenPos=k;
   for (x=0; (c=S[k])>='0' && c<='9'; k++) if (x<HV)
           x=x*10+c-'0';

if (x>HV) x=HV; if (k==TokenPos) x=NV;
   SPos=k; return(x);
}

/**************************************************************/
/*** Input Fraction. Returns:   -1.0    if no fraction        */
/***                            -2.0    if incorrect syn      */
double infrac () {             /*  fraction otherwise         */
   SLONG k,kk; double f,x;
   UBYTE c;

k=SPos; while ((c=S[k])==' ') k++;
   TokenPos=k;
   if (S[k++]!='.') return(-1.0);
   if (S[k]<'0' || S[k]>'9') return(-2.0);
   for (f=0,x=1; (c=S[k])>='0' && c<='9'; k++) {x/=10;
f+=x*(c-'0');}
   SPos=k; return(f);
}

/**************************************************************/
/*** Input Character. Returns: next non-blank char or         */
/*                             concluding zero                */
inchar () {
   SLONG k; UBYTE c;
   k=SPos; while ((c=S[k])==' ') k++;
   TokenPos=k;
   if (c!=0) k++; SPos=k; return(c);
}
/**************************************************************/
/*** Check for Available Space. Returns: avail bytes          */
check_space () {
   UBYTE *p; SLONG i,j;
/*??
```

```
    for (i=1000000; i<HV; i+=i/2) {
        if ((p=alloc(i+100000))==NULL) break;
        free(p); j=i;}
    if (j>HV) j=HV; if (i<=1000000) j=0;
*/
    j=POOL_B_SIZE;
    return(j);
}

/*****************************************************/
init_seed () {
    SLONG i,j;
    DblC63=sqrt(63.0); Dbl1.u.g=1.0; DblS.u.g=sqrt(2.0);
/*LRAND-related*/
    for (i=10; --i>=0; ) j=LRAND;  /*just few iterations for a good start*/
}

/*****************************************************/
/*** Hash function                                 */
hash (n) SLONG n; {
    struct {union {double g;
                    int   i[2];}u; }s;

s.u.g=HashConst1+HashConst2*n;

return(s.u.i[1]&0x7fffffff);
}

/*****************************************************/
/*** Bell distribution function                    */
bell (xx,ss) double xx,ss; {double x=xx,s=ss; SLONG i;
    if (s<1/(double)M10)
        x=1;
    else
        x=1-s*(s+1)/(s+x)+s*(s+1)/(s+1-x);
    i=DEG_SZ*x+0.4999;
    return(i);
}

/*****************************************************/
/*** Calculate new degrees                         */
new_degs (ii,jj) SWORD ii,jj; {SWORD i=ii,j=jj,k,l,a,h,n;
```

```
    k=bell(DRAND(),Top.sigma);
    if (j<0) {
        a=(i+k)/2; if (a<DEG_SZ) a=(i+k+1)/2;
        h=MAX(i,k); l=MIN(i,k);}
    else {
        a=(i+j+k)/3; if (a<DEG_SZ) a=(i+j+k+2)/3;
        h=MAX(i,MAX(j,k)); l=MIN(i,MIN(j,k));}
    if      (a<DEG_SZ) n=(3*l+a)/4;
    else if (a>DEG_SZ) n=(3*h+a)/4;
    else               n=a;
    return(n);
}

/*******************************************************/
/*** Dump node                                        */
dno (inode) struct node_ *inode; {
    SLONG i;
    printf("node at%11d  count=%d card=%d rank=%d\n", (ULONG)inode,inode->count,inode->card,(SLONG)(inode->rank));
    for (i=0; i<inode->count && i<Top.max_degree+1; i++)
        printf("  %3d: %11d  rank=%d  efan=%d\n",
               i,inode->br[i].u.card, (SLONG)(inode->br[i].rank),(SLONG)(inode->br[i].efan));
}

/*******************************************************/
/*** Dump path                                        */
dpa () {
    SLONG i;
    PRF2("Path   root_lev=%d card=%d\n",
         Path.root_lev,Path.card);
    for (i=Path.root_lev; i>=2; i--)
        printf("  %3d: node=%-11d branch=%d  epsilon=%g  pepsi%g
            pfan=%g\n",
               i,(SLONG)Path.lev[i].node,Path.lev[i].branch, Path.lev[i].epsilon,Path.lev[i].pepsi,Path.lev[i].pfan);
}

/*******************************************************/
```

```
copy_top (t1,t2) struct top_ *t1,*t2; {
    t2->min_degree=t1->min_degree;
    t2->max_degree=t1->max_degree;
    t2->lo_degree=t1->lo_degree;
    t2->hi_degree=t1->hi_degree;
    t2->fan_bound=t1->fan_bound;
    t2->sigma=t1->sigma;
    t2->epsilon=t1->epsilon;
    t2->eps1=t1->eps1;
}

/*****************************************************/
copy_req (r1,r2) UBYTE *r1,*r2; {
    SLONG i;
    for (i=sizeof(Req); --i>=0; ) r2[i]=r1[i];
}

/*****************************************************/
init_req () {
    SLONG i;
    Req.ins_point=0;
    Req.ins_point_quant=0;
    Req.ins_rand_quant=0;
    Req.ins_point_advance=1;
    Req.del_point=0;
    Req.del_point_quant=0;
    Req.del_rand_quant=0;
    Req.del_point_advance=1;

/*___*/
    Path.lev[2].epsilon=Top.epsilon;
    for (i=2; ++i<=DEPTH_LIM; ) {
        Path.lev[i].epsilon=Path.lev[i-1].epsilon*Top.eps1;
        if (Path.lev[i].epsilon>HV) Path.lev[i].epsilon=HV;}
    Path.lev[2].pepsi=Top.epsilon+1;
    for (i=2; ++i<=DEPTH_LIM; ) {

Path.lev[i].pepsi=Path.lev[i-1].pepsi*(1+Path.lev[i].epsilon);
        if (Path.lev[i].pepsi>GHV) Path.lev[i].pepsi=GHV;}

/*___Set FBounds (fan bounds) vector*/
    {double f_bound=1.0;
    for (i=1; ++i<=DEPTH_LIM; ) {
```

```
        f_bound*=Top.fan_bound;
        f_bound=MIN(f_bound,GHV);
        Path.lev[i].pfan=f_bound;}
    }

/*___Set HiDegs and LoDegs vectors*/
    {double h0,h1,f,fh1,x; SLONG i,j,k;
    fh1=(double)Top.hi_degree/Top.lo_degree;
    h0=Top.min_degree*2; h1=Top.hi_degree;
    f=exp(1/((double)DEG_SZ)*log(h1/h0));
    for (x=h0,k=0; k<=DEG_SZ; k++,x*=f) {
        i=x*1.001+0.5; j=x/fh1/1.001+0.5;
        LoDegs[k]=MAX(j,Top.min_degree);
HiDegs[k]=MAX(i,Top.min_degree*2);
        if (HiDegs[k]>Top.max_degree) {
            HiDegs[k]=Top.max_degree; LoDegs[k]=Top.min_degree;}
        }
    h0=Top.lo_degree; h1=(SLONG)(Top.max_degree/2);
    f=exp(1/((double)DEG_SZ)*log(h1/h0));
    for (x=h0,k=DEG_SZ; k<=DEG_SZ*2; k++,x*=f) {
        i=x*fh1*1.001+0.5; j=x/1.001+0.5;
        HiDegs[k]=MIN(i,Top.max_degree);
LoDegs[k]=MIN(j,Top.max_degree/2);
        if (LoDegs[k]<Top.min_degree) {
            HiDegs[k]=Top.max_degree; LoDegs[k]=Top.min_degree;}
        }
    }
    /*___Init all node pool to zeroes*/
/*  {SLONG *lpool=Pool,i;
        for (i=PoolBSize/4; --i>=0; ) lpool[i]=0;}  ??kill it*/
}

/*******************************************************/
/*** Process a single request                        */
request () {
    SLONG req_iter, quant_iter, check_flag=0; float x;

Req.upd_count=Req.eps_count=Req.eps_count_during_update=Req.io_co
unt=0;
```

```
        if (Req.ins_point_quant==0 &&
            Req.ins_rand_quant==0 &&
            Req.del_point_quant==0 &&
            Req.del_rand_quant==0) return;
        for (Req.req_iter=0; ++Req.req_iter<=Req.count; ) {
            Req.quant_type="InsPoint";
            for (Req.quant_iter=0;
 ++Req.quant_iter<=Req.ins_point_quant; ) {
                exe_insert(0);
                if (check_flag) check_btree();
            }
            Req.quant_type="InsRand";
            for (Req.quant_iter=0;
 ++Req.quant_iter<=Req.ins_rand_quant; ) {
                exe_insert(1);
                if (check_flag) check_btree();
            }
            Req.quant_type="DelPoint";
            for (Req.quant_iter=0;
 ++Req.quant_iter<=Req.del_point_quant; ) {
                exe_delete(0);
                if (check_flag) check_btree();
            }
            Req.quant_type="DelRand";
            for (Req.quant_iter=0;
 ++Req.quant_iter<=Req.del_rand_quant; ) {
                exe_delete(1);
                if (check_flag) check_btree();
            }
        } /*end of request iteration*/
        if (Req.io_count>0) {
            x=100*Req.eps_count/(double)Req.io_count;
            PRF3("BoundIOs=%d  UpdIOs=%d  Ratio=%.2f%%\n",
                Req.eps_count,Req.io_count,x);}
        display();
}

/**********************************************************/
/*** Insert into Btree at Req.ins_point                  */
                                /* type=0 - after/before  */
exe_insert (type) ULONG type; {  /* type=1 - random       */
```

```
   SWORD trig_degs;
   SLONG point,branch,level,fan,i;
   float rank;
   struct node_ *inode,*i1node,*i2node;

Req.upd_count+=1;
   if (Path.root_lev<=1) {
      Path.root_lev=2;
      inode=get_free_node();
      Path.lev[Path.root_lev].node=inode;
      Path.card=1;
      inode->count=1;
      inode->card=1;
      inode->rank=1.0;
      inode->br[0].u.card=1;
      inode->br[0].rank=1.0;
      inode->br[0].efan=1;
      inode->br[0].degs=bell(DRAND(),Top.sigma);
      Path.root_degs=bell(DRAND(),Top.sigma);
      if (type==0) Req.ins_point=Req.ins_point_advance;
/*after:0, before:1*/
      Req.io_count+=1;   /*1 write*/
      return;
      }
   if (type==0) point=Req.ins_point;
   else         point=LRAND%(Path.card+1);
   find_point(point);
   Req.io_count+=Path.root_lev-1;

/*descend reads (root is cashed)*/

/*___Start of insert*/
   /*   The following code messes Path:  next time we need
find_point again*/
   /*   We update the insert point and cardinality here at the
         insert start*/
   if (type==0) {Req.ins_point+=Req.ins_point_advance;
                 Req.ins_point_advance^=Req.ins_point_flip;}
   Path.card++;
   level=2;

inode=Path.lev[2].node;
   inode->card+=1;
```

```
branch=Path.lev[2].branch;
fan=inode->br[branch].u.card+1;
Req.io_count+=1;   /*1 write of the updated level 1 node*/ trig_degs=(2==Path.root_lev)?Path.root_degs:

Path.lev[3].node->br[Path.lev[3].branch].degs;
   if (fan<=HiDegs[trig_degs]) {
                     /*only one (leaf) node is affected*/
      inode->br[branch].u.card=fan;
        {  /*___update rank if deviates too much*/
         double c=inode->br[branch].u.card,
              r=inode->br[branch].rank;

if (c>r*Path.lev[2].pepsi ||
             c>Path.lev[2].pfan) {
            inode->rank+=(fan-inode->br[branch].rank);
            inode->br[branch].rank=fan;
            inode->br[branch].efan=fan;
            if (inode->count>=2) Req.eps_count+=1;}
        }
     goto ins_conclusion;}

/*___insert a new entry into the level 2 node*/
for (i=inode->count; --i>=branch; ) {
   inode->br[i+1].u.card=inode->br[i].u.card;
   inode->br[i+1].rank=inode->br[i].rank;
   inode->br[i+1].efan=inode->br[i].efan;
   inode->br[i+1].degs=inode->br[i].degs;}
inode->count+=1;
inode->rank+=(float)(fan)-inode->br[branch].rank;
i=fan/2;
inode->br[branch+1].u.card=i;
inode->br[branch].u.card=fan-i;
inode->br[branch+1].rank=(float)i;
inode->br[branch].rank=(float)(fan-i);
inode->br[branch+1].efan=i;
inode->br[branch].efan=fan-i;

inode->br[branch].degs=bell(DRAND(),Top.sigma);

Req.io_count+=1;   /*1 write of updated level 2 node*/
```

```
/*___propagate splits up the Path if needed*/
while (trig_degs=(level==Path.root_lev)
                ?Path.root_degs :Path.lev[level+1].node->br[Path.lev[level+1].branch].degs,
        inode->count>HiDegs[trig_degs]) { i1node=inode;
    i2node=get_free_node();
    if (level==Path.root_lev) {   /*___create a new root node*/
        if (level>=DEPTH_LIM) {
            PRF1("*** Btree too high (%d)\n",level+1); ABORT;}
        inode=get_free_node();
        inode->count=1;
        inode->card=i1node->card-1;
                        /*one less not to +=1 twice*/
        inode->rank=i1node->rank;
        inode->br[0].u.node=i1node;
        inode->br[0].rank=i1node->rank;
        inode->br[0].efan=i1node->count;
        inode->br[0].degs=i1node->br[0].degs;
        Path.root_degs=bell(DRAND(),Top.sigma);
        Path.root_lev++;
        Path.lev[Path.root_lev].node=inode;
        Path.lev[Path.root_lev].branch=0;
    }
    else inode=Path.lev[level+1].node;

/*___split the node*/
    i2node->count=i1node->count/2;
    fan=i1node->count-i2node->count;
    for (i=i1node->count; --i>=fan; ) {
        i2node->br[i-fan].u.node=i1node->br[i].u.node;
        i2node->card+=(level==2)?(i1node->br[i].u.card)
                            :(i1node->br[i].u.node->card);
        i2node->br[i-fan].rank=i1node->br[i].rank;
        i2node->rank+=i1node->br[i].rank;
        i2node->br[i-fan].efan=i1node->br[i].efan;
        i2node->br[i-fan].degs=i1node->br[i].degs;
    }
    i1node->count=fan;
```

```
      i1node->card-=i2node->card;
      i1node->rank-=i2node->rank;

Req.io_count+=1;   /*1 write for a new node*/

/*___insert extra node into the above level*/
      {
      level++;
      branch=Path.lev[level].branch;
      for (i=inode->count; --i>branch; ) {
          inode->br[i+1].u.card=inode->br[i].u.card;
          inode->br[i+1].rank=inode->br[i].rank;
          inode->br[i+1].efan=inode->br[i].efan;
          inode->br[i+1].degs=inode->br[i].degs;}
      inode->count+=1; inode->card+=1;

inode->rank+=(i1node->rank+i2node->rank)-inode->br[branch].rank;
      inode->br[branch].u.node=i1node;
      inode->br[branch+1].u.node=i2node;
      inode->br[branch].rank=i1node->rank;
      inode->br[branch+1].rank=i2node->rank;
      inode->br[branch].efan=i1node->count;
      inode->br[branch+1].efan=i2node->count;

inode->br[branch].degs=bell(DRAND(),Top.sigma);

Req.io_count+=1;   /*1 write to update the parent*/
      }
   }   /*end of loop propagating inserts up the Path*/ ins_conclusion:
   /*___update cardinalities*/
   while (++level<=Path.root_lev) {
      inode=Path.lev[level].node;
      branch=Path.lev[level].branch;
      inode->card+=1;

{ /*___update rank if deviates too much*/
          SLONG b,l=level-1; double rr,r=inode->br[branch].rank;
          struct node_ *jnode=inode->br[branch].u.node;

for (rr=0,b=jnode->count; --b>=0; ) {
```

```
               double x,y;
               x=jnode->br[b].rank*Path.lev[l].pepsi;
               y=Path.lev[l].pfan;
               rr+=MIN(x,y);}
         if (rr>r*Path.lev[level].pepsi) { inode->br[branch].rank=inode->br[branch].u.node->rank;

inode->br[branch].efan=inode->br[branch].u.node->count;
               inode->rank=0.0;
               for (i=inode->count; --i>=0; )
inode->rank+=inode->br[i].rank;
               Req.eps_count+=1;}
            }
        } if (Req.del_point>=Req.ins_point) Req.del_point++;
}

/*****************************************************/
/*** Delete from Btree at Req.del_point            */
                            /* type=0 - after/before  */
exe_delete (type) ULONG type; {  /* type=1 - random   */
    SLONG branch,level,fan,i;
    float rank;
    struct node_ *inode;

/*___empty B-tree case*/
    if (Path.root_lev<=1) {if (Path.root_lev!=0) ABORT;
       return;}
    Req.upd_count+=1;

/*___set and find point*/
       {SLONG point;

if (type==0)  point=Req.del_point;
    else          point=LRAND%(Path.card+1);
    find_point(point);  /*establishes Path*/

Req.io_count+=Path.root_lev-1;
                    /*descend reads (root is cashed)*/
```

```
        if (type==0) {Req.del_point+=Req.del_point_advance-1;
                Req.del_point_advance^=Req.del_point_flip;}
        if (Req.ins_point>=point) Req.ins_point--;
        }
   Path.card--;
   /*the following code messes Path:   next time we need
find_point again*/

/*___delete from level==2 branch, i.e. from level 1*/
   inode=Path.lev[2].node;
   branch=Path.lev[2].branch;
   inode->br[branch].u.card-=1;

{  /*___update rank if deviates too much*/
       double c=inode->br[branch].u.card,
              r=inode->br[branch].rank;

if (c<r/(1+Path.lev[2].epsilon)) {
           inode->rank-=(r-c);
           inode->br[branch].rank=inode->br[branch].u.card;
           inode->br[branch].efan=inode->br[branch].u.card;
           if (inode->count>=2) Req.eps_count_during_update+=1;}
   }

/*___single node case*/
   if (Path.root_lev==2 && inode->count<=1) {if (inode->count!=1)
ABORT;
/*    Req.io_count-=1;  -- compensate for descend reads
(root=leaf)*/
/*    Req.io_count+=1;  - 1 write of the leaf node*/ inode->card=inode->br[0].u.card;
       inode->rank=inode->br[0].rank;
       if (inode->br[0].u.card<=0) {if (inode->br[0].u.card!=0)
ABORT;
           Top.free_node_list=NULL;
           Top.free_pool_node=Pool;
           Path.root_lev=0;}  /*make it "empty" Btree*/
       return;}
```

```c
/*___Propagate merges up the Path if needed*/
/* Empty nodes (count==0) are possible at the current level*/
/*                    and are deleted at the level below*/
for (level=2; level<=Path.root_lev; level++) {
   inode=Path.lev[level].node;
   branch=Path.lev[level].branch;
   fan=(level==2)?inode->br[branch].u.card
                 :inode->br[branch].u.node->count;

if (fan==0) {    /*___the "branch" node became empty*/
      if (level>=3) {              /*kill empty node below*/
         struct node_ *ilnode;
         ilnode=inode->br[branch].u.node;
         ilnode->br[0].u.node=Top.free_node_list;
         Top.free_node_list=ilnode;}
      for (i=branch; ++i<inode->count; ) {
                                   /*kill empty entry*/
         inode->br[i-1].u.card=inode->br[i].u.card;
         inode->br[i-1].rank=inode->br[i].rank;
         inode->br[i-1].efan=inode->br[i].efan;
         inode->br[i-1].degs=inode->br[i].degs;}
      inode->count-=1;
      inode->card-=1;
      inode->rank=0.0;
      for (i=inode->count; --i>=0; )
inode->rank+=inode->br[i].rank;
      if (inode->count==0) {
         if (level==Path.root_lev) {
            Top.free_node_list=NULL;
            Top.free_pool_node=Pool;
            Path.root_lev=0;  /*make it "empty" Btree*/
            return;}  /*Btree became empty*/
         continue;}  /*current node became empty*/
      goto del_conclusion;
   }
   if (fan>=Top.min_degree ||
       inode->count==1} {  /*___no propagation of delete*/
      inode->card-=1;

if (level>=3) {  /*___update rank if deviates too much*/
         double rr=inode->br[branch].u.node->rank,
                r=inode->br[branch].rank;
```

```
                if (rr<r/(1+Path.lev[level].epsilon)) { inode->br[branch].rank=inode->br[branch].u.node->rank;

inode->br[branch].efan=inode->br[branch].u.node->count;
                    inode->rank=0.0;
                    for (i=inode->count; --i>=0; )
inode->rank+=inode->br[i].rank;
                    Req.eps_count_during_update+=1;}
                }
            goto del_conclusion;
            }
        /*___Merge or Redistribute*/ {
            SLONG fans,fan1,branch1;
            struct node_ *i0node,*i1node;

branch1=branch+1;
                /*make branch,branch1 sequence follow index order*/
            if (branch1>=inode->count) {branch1=branch; branch--;} fan=(level==2)?inode->br[branch].u.card
                         :inode->br[branch].u.node->count;
            fan1=(level==2)?inode->br[branch1].u.card
                          :inode->br[branch1].u.node->count;
            fans=fan+fan1;
            if (2*(Top.max_degree-fans)>(fans-2*Top.min_degree)) { if (fans>Top.max_degree) ABORT;

/*___merge*/
                if (level==2) {
                    inode->br[branch].u.card=fans;
                    inode->br[branch].rank=(float)fans;
                    inode->br[branch].efan=fans;
                }
                else {
                    i0node=inode->br[branch].u.node;
                    i1node=inode->br[branch1].u.node;
                    for (i=i1node->count; --i>=0; ) { /*copy entries*/
                        i0node->br[fan+i].u.node=i1node->br[i].u.node;
                        i0node->br[fan+i].rank=i1node->br[i].rank;
```

```
            i0node->br[fan+i].efan=i1node->br[i].efan;
            i0node->br[fan+i].degs=i1node->br[i].degs;}
        i1node->br[0].u.node=Top.free_node_list;
        Top.free_node_list=i1node;

i0node->count+=i1node->count;
        i0node->card+=i1node->card;
        i0node->rank+=i1node->rank;

inode->br[branch].efan=i0node->count;
        inode->br[branch].rank=i0node->rank;
        }
    for (i=branch1; ++i<inode->count; ) {/*delete entry*/
        inode->br[i-1].u.node=inode->br[i].u.node;
        inode->br[i-1].rank=inode->br[i].rank;
        inode->br[i-1].efan=inode->br[i].efan;
        inode->br[i-1].degs=inode->br[i].degs;} inode->count-=1;
    inode->rank=0.0;
    for (i=inode->count; --i>=0; )
        inode->rank+=inode->br[i].rank;

Req.io_count+=2;  /*1 read + 1 write*/
    } /*end of merge*/
else {
    /*___redistribute*/
    SLONG fann,fann1;
    if (fans<2*Top.min_degree) ABORT;

fann=fans/2; fann1=fans-fann;
    if (level==2) {
        /*we do not update inode->rank here (extra I/O)*/
        inode->br[branch].u.card=fann;
        inode->br[branch1].u.card=fann1;
        inode->br[branch].rank=(float)fann;
        inode->br[branch1].rank=(float)fann1;
        inode->br[branch].efan=fann;
        inode->br[branch1].efan=fann1;
        inode->rank=0.0;
        for (i=inode->count; --i>=0; )
            inode->rank+=inode->br[i].rank;
```

```
            }
        else {
            SLONG j;
            i0node=inode->br[branch].u.node;
                                /*i0node has the lowest fan*/
            i1node=inode->br[branch1].u.node;
            if (fan<fann) {
                for (i=fan,j=0; i<fann; i++,j++) {
                                            /*copy i1 to i0*/
                    i0node->br[i].u.node=i1node->br[j].u.node;
                    i0node->br[i].rank=i1node->br[j].rank;
                    i0node->br[i].efan=i1node->br[j].efan;
                    i0node->rank+=i0node->br[i].rank;
                    i1node->rank-=i0node->br[i].rank;

i0node->card+=(level==3)?i0node->br[i].u.card

:i0node->br[i].u.node->card;

i1node->card-=(level==3)?i0node->br[i].u.card

:i0node->br[i].u.node->card;}
                for (i=0; j<fan1; i++,j++) { /*close i1 gap*/
                    i1node->br[i].u.node=i1node->br[j].u.node;
                    i1node->br[i].rank=i1node->br[j].rank;
                    i1node->br[i].efan=i1node->br[j].efan;}
            }
            else {
                for (j=fann1-1,i=fan1-1; i>=0; j--,i--) {
                                            /*open i1 gap*/
                    i1node->br[j].u.node=i1node->br[i].u.node;
                    i1node->br[j].rank=i1node->br[i].rank;
                    i1node->br[j].efan=i1node->br[i].efan;}
                for (i=fan-1; j>=0; i--,j--) {
                                            /*copy i0 to i1*/
                    i1node->br[j].u.node=i0node->br[i].u.node;
                    i1node->br[j].rank=i0node->br[i].rank;
                    i1node->br[j].efan=i0node->br[i].efan;
                    i0node->rank-=i0node->br[i].rank;
                    i1node->rank+=i0node->br[i].rank;
```

```
i0node->card-=(level==3)?i0node->br[i].u.card

:i0node->br[i].u.node->card;

i1node->card+=(level==3)?i0node->br[i].u.card

:i0node->br[i].u.node->card;}
            }
            i0node->count=fann; i1node->count=fann1;

inode->br[branch].efan=i0node->count;
            inode->br[branch1].efan=i1node->count;
            inode->br[branch].rank=i0node->rank;
            inode->br[branch1].rank=i1node->rank;
            inode->rank=0.0;
            for (i=inode->count; --i>=0; )
inode->rank+=inode->br[i].rank;
         } /*eof level>2 case*/
         /*inode is not updated in the redistribution case */
         /* in this program but in reality inode is */
         /* updated with new separator*/

Req.io_count+=3;  /*1 read + 2 writes*/
         } /*eof redistribute*/
       inode->card-=1;
     } /*eof merge or redistribute*/

} /*eof propagating merges up the Path*/
del_conclusion:

Req.io_count+=1;  /*1 write for the parent update*/

/*___update cardinalities, get rid of single-thread root*/
   while (++level<=Path.root_lev) {
      inode=Path.lev[level].node;
      branch=Path.lev[level].branch;
      inode->card-=1;

{ /*___update rank if deviates too much*/
        double rr=inode->br[branch].u.node->rank,
            r=inode->br[branch].rank;
```

```
        if (rr<r/(1+Path.lev[level].epsilon)) { inode->br[branch].rank=inode->br[branch].u.node->rank;

inode->br[branch].efan=inode->br[branch].u.node->count;
            inode->rank=0.0;
            for (i=inode->count; --i>=0; )
inode->rank+=inode->br[i].rank;
            Req.eps_count+=1;}
        }
    }
    for (level=Path.root_lev; level>=3; level--) {
        inode=Path.lev[level].node;
        if (inode->count>1) break;
        Path.root_degs=inode->br[0].degs;
        Path.root_lev=level-1;
        Path.lev[level-1].node=inode->br[0].u.node;
        inode->br[0].u.node=Top.free_node_list;
        Top.free_node_list=inode;}
}
/**************************************************/
/*** Find point in Btree by setting a correct Path        */
find_point (given_point) SLONG given_point; {
    SLONG point,level,lpoint,prev_lpoint,branch,i;
    struct node_ *inode;
    point=given_point-1;
            /*given_point covers B-tree as 1,2,...,card      */
            /* we need to translate it to 0,1,... for search*/
    if (Path.root_lev<=0) return;
    lpoint=0;
    for (level=Path.root_lev; level>=3; --level) {
        inode=Path.lev[level].node;
        for (branch=0; branch<inode->count; ++branch) {
            prev_lpoint=lpoint;
            lpoint+=inode->br[branch].u.node->card;
            if (lpoint>point){branch++; break;}}
        branch--; lpoint=prev_lpoint;
        Path.lev[level].branch=branch;
        Path.lev[level-1].node=inode=inode->br[branch].u.node;
    }
    inode=Path.lev[2].node;
```

```
     for (branch=0; branch<inode->count; ++branch) {
        prev_lpoint=lpoint;
        lpoint+=inode->br[branch].u.card;
        if (lpoint>point) {branch++; break;}}
     branch--; lpoint=prev_lpoint;
     Path.lev[2].branch=branch;
     i=point-lpoint; i=MIN(i,inode->br[branch].u.card); i=MAX(i,0);
     Path.lev[1].branch=i;
}

/*********************************************************/
/*** Get a free node.  Returns a pointer to free node    */
get_free_node () {
    struct node_ *inode;
    if (Top.free_node_list!=NULL) {
       inode=Top.free_node_list;
                   /*nibble a free node from the list*/
       Top.free_node_list=Top.free_node_list->br[0].u.node;}
    else {
       inode=Top.free_pool_node;
                   /*nibble a free node from the Pool*/

Top.free_pool_node=(SLONG)Top.free_pool_node+Top.node_bsize;
       if ((SLONG)Top.free_node_list-(SLONG)Pool>=PoolBSize) {
          PRF1("*** Too many nodes inserted (%d)\n",Path.card);
              ABORT;}}

{SLONG i,*lnode=inode;
      for (i=Top.node_bsize/4; --i>=0; ) lnode[i]=0;}
    inode->count=0; inode->card=0; inode->rank=0.0;
    return(inode);
}

/*********************************************************/
/*** Print B-tree                                        */
print_btree () {
    SLONG point,next_point,level,branch;
    struct node_ *inode;
    struct path_ xpath;

if (Path.root_lev<=1) {PRF("B-tree is empty\n"); return;}
    PRF2("B-tree:   root_lev=%d
```

```
        card=%d\n",Path.root_lev,Path.card);
    for (point=1; point<=Path.card; point++) {
        /*___look ahead*/
        find_point(point);

next_point=point+Path.lev[2].node->br[Path.lev[2].branch].u.card;
        find_point(next_point);
        for (level=Path.root_lev; level>=2; level--)
            xpath.lev[level].node=Path.lev[level].node;   /*store
next-path nodes*/ find_point(point);
        PRF1("%3d: ",point);
        for (level=Path.root_lev; level>=2; level--) {
            if (Path.root_lev>7 && level==Path.root_lev-3) {
                PRF(" ... "); level=5;}
            else {
                inode=Path.lev[level].node;
                branch=Path.lev[level].branch;
                PRF4("%d(%d:%d)%c",
                    (level==2)?inode->br[branch].u.card
                              :inode->br[branch].u.node->card,
                    (SLONG)(inode->br[branch].rank),
                    (SLONG)(inode->br[branch].degs), (Path.lev[level-1].node!=xpath.lev[level-1].node &&
                    level>=3 && level<=Path.root_lev)?'_':' ');}
        }
        if (point==1) {
            if (Req.ins_point<point) PRF("^ins");
            if (Req.del_point<point) PRF("^del");}
        if (Path.card>=point && Path.card<next_point) {
            if (Req.ins_point>=next_point) PRF("_ins");
            if (Req.del_point>=next_point) PRF("_del");}
        if (Req.ins_point>=point && Req.ins_point<next_point)
            PRF("-ins");
        if (Req.del_point>=point && Req.del_point<next_point)
            PRF("-del");
        PRF("\n");
        point+=inode->br[branch].u.card-1;
                    /*inode & branch are at Path.lev[2]*/
    }
```

```
/***********************************************************/
/*** Check B-tree for correctness                          */
check_btree () {
    SLONG point,level,branch,i;
    struct node_ *inode;

if (Path.root_lev==0) return;
    if (Path.root_lev<2 || Path.root_lev>DEPTH_LIM) ABORT;
    if (Path.lev[Path.root_lev].node->card!=Path.card) ABORT;

level=Path.root_lev; inode=Path.lev[level].node;
    while (TRUE) {
        if ((SLONG)inode<(SLONG)BigPool ||
            (SLONG)inode>(SLONG)BigPool+PoolBSize) ABORT;
        if (inode->count<Top.min_degree) {
            if (Path.root_lev!=2) if (level!=Path.root_lev) ABORT;
            if (inode->count<=0) ABORT;}
        if (inode->count>Top.max_degree) ABORT;
        {double x=0.0;
         for (i=inode->count; --i>=0; )
x+=(double)(inode->br[i].rank);
         if (inode->rank!=x) ABORT;}

Path.lev[level].node=inode;
        Path.lev[level].branch=0;
        Path.lev[level].card=0;
        if (level>=3) {
            level--; inode=inode->br[0].u.node; continue;} while (TRUE) {
            branch=Path.lev[level].branch;
            {double rr=(level>=3)?(inode->br[branch].u.node->rank)
                               :(inode->br[branch].u.card),
             r=inode->br[branch].rank;
            if (rr>Path.lev[level].pfan) ABORT;}
                            /*we skip here upper bound check*/

Path.lev[level].card+=(level==2)?inode->br[branch].u.card
```

```
              :inode->br[branch].u.node->card;
            branch++; Path.lev[level].branch=branch;

if (branch>=inode->count) {
                if (Path.lev[level].card!=inode->card) ABORT;
                if (level==Path.root_lev) return;
                level++; inode=Path.lev[level].node; continue;}
            if (level==2) continue;
            level--; inode=inode->br[branch].u.node; break;
            }
        }
    }
}

/******************************************************/
/*** Display approximate rank differences           */
display () {
    SLONG point,level,branch,i,nodes=0;
    struct node_ *inode;
    double total_fan, avg_fan, total_fan_ratio, total_rank_ratio;
    SLONG max_fan;

if (Path.root_lev==0) {PRF("Tree is empty"); return;}
    if (Path.root_lev<2 || Path.root_lev>DEPTH_LIM) ABORT;
    if (Path.lev[Path.root_lev].node->card!=Path.card) ABORT;
    total_fan=0.0; max_fan=0;
    total_fan_ratio=0.0;  total_rank_ratio=0.0;
    level=Path.root_lev; inode=Path.lev[level].node;
    while (TRUE) {
        if ((SLONG)inode<(SLONG)BigPool ||
            (SLONG)inode>(SLONG)BigPool+PoolBSize) ABORT;
        if (inode->count<Top.min_degree) {
            if (Path.root_lev!=2) if (level!=Path.root_lev) ABORT;
            if (inode->count<=0) ABORT;}
        if (inode->count>Top.max_degree) ABORT;
        Path.lev[level].node=inode;
        Path.lev[level].branch=0;
        Path.lev[level].card=0;
        nodes++;
        if (level>=3) {  /*descend*/
            level--; inode=inode->br[0].u.node; continue;}
```

```
            while (TRUE) {
                branch=Path.lev[level].branch;

Path.lev[level].card+=(level==2)?inode->br[branch].u.card

:inode->br[branch].u.node->card;
            /*___accumulate statistics*/
            if (level==2) {SLONG l,b; struct node_ *lnode;
                float fan,fan_ratio,rank_ratio;
                fan=0.0; fan_ratio=1.0; rank_ratio=1.0;
                for (l=Path.root_lev; l>=3; l--) {
                    lnode=Path.lev[l].node; b=Path.lev[l].branch;
                    fan+=lnode->br[b].u.node->count;
                    max_fan=MAX(max_fan,lnode->br[b].u.node->count);

fan_ratio*=(double)(lnode->br[b].u.node->count)/Top.fan_bound;
                    {double r1,r2;
                     r1=lnode->br[b].rank*(1+Path.lev[l].epsilon);
                     r2=Path.lev[l].pfan;
                     rank_ratio*=lnode->br[b].u.node->rank/MIN(r1,r2);
                    }
                }
                fan+=inode->br[branch].u.card;
                fan/=Path.root_lev-1;
                total_fan+=fan*inode->br[branch].u.card;
                max_fan=MAX(max_fan,inode->br[branch].u.card);

fan_ratio*=(double)(inode->br[branch].u.card)/Top.fan_bound;
                total_fan_ratio+=fan_ratio*inode->br[branch].u.card;

{double r1,r2;
                 r1=inode->br[branch].rank*(1+Path.lev[2].epsilon);
                 r2=Path.lev[2].pfan;
                 rank_ratio*=inode->br[branch].u.card/MIN(r1,r2);
                } total_rank_ratio+=rank_ratio*inode->br[branch].u.card;
            }
            branch++; Path.lev[level].branch=branch;

if (branch>=inode->count) {
```

```
            if (Path.lev[level].card!=inode->card) ABORT;
            if (level==Path.root_lev) goto conclusion;
            level++; inode=Path.lev[level].node; continue;}
        if (level==2) continue;
        level--; inode=inode->br[branch].u.node; break;
        }
    }
conclusion:
    {double max_fan_prod=1.0, fan_bound_prod=1.0;
     double x,y; SLONG i;
     for (i=Path.root_lev-1; --i>=0; ) {
        max_fan_prod*=(double)max_fan;
fan_bound_prod*=(double)Top.fan_bound;}
        avg_fan=(total_fan/Path.card);
        PRF5("Card=%d Lev=%d  Fan:lim=%d,max=%d,avg=%.2f", Path.card,Path.root_lev-1,Top.max_degree,max_fan,avg_fan);
        x=total_fan_ratio/Path.card;
        y=total_rank_ratio/Path.card;
/*?? stuff upward till "conclusion" is not needed */ level=Path.root_lev; inode=Path.lev[level].node;
        x=(inode->count*Path.lev[level].pfan)/Path.card-1;
        for (y=0,i=inode->count; --i>=0; ) { /*compute sum of upper
bounds of root*/
            double xc,xf;
            xc=inode->br[i].rank*Path.lev[level].pepsi;
            xf=Path.lev[level].pfan;
            y+=MIN(xc,xf);}
        y=y/Path.card-1;

PRF1("  Ratio: %.5f",x);
        if (Path.lev[2].epsilon<HV) PRF1(":%.5f",y);
        PRF("\n");
        }
}
```

What is claimed is:

1. A computer-implemented method of random sampling of nodes of a hierarchical data structure in memory of a digital computer, said hierarchical data structure defining a plurality of nodes including intermediate nodes and leaf nodes, each of said intermediate nodes being defined by said hierarchical data structure as a child of another one of said plurality of nodes, and each of said intermediate nodes being defined as a parent of another one of said plurality of nodes, each of said leaf nodes being defined as a child of another one of said plurality of nodes, and each of said leaf nodes having an assigned weight; said method comprising the steps of:

a) said digital computer assigning a weight to each of said intermediate nodes such that the weight assigned to each intermediate node is not less than a sum of the weights assigned to the children of said each intermediate node, and at least some of said intermediate nodes have a weight that is greater than the sum of the weights assigned to the children of said each intermediate node; and then b) said digital computer selecting one of said intermediate nodes, the selection of said one of said intermediate nodes being based on the weight of said one of said intermediate nodes such that selecting said one of said intermediate nodes has a probability proportional to the weight of said one of said intermediate nodes; and then c) said digital computer performing a random acceptance/rejection selection of a node which is a selected child of the node selected in the previous step, said random acceptance/rejection being weighted proportional to the weight of the selected child of the node selected in the previous step, and said random acceptance/rejection being weighted inversely proportional to the weight of the node selected in the previous step; and then d) said digital computer repeating said step c) until a leaf node is selected by said random acceptance/rejection selection in said step c); and then e) said digital computer retrieving, from said memory, a data item that is indexed by the selected leaf node, whereby a random selection of a selected leaf node and an indexed data item is obtained and the random selection of the selected leaf node and the indexed data item is weighted by the assigned weight of the selected leaf node.

2. The method as claimed in claim 1, wherein all of said leaf nodes are assigned the same weight, so that the random selection of the leaf node is simple and unbiased.

3. The method as claimed in claim 1, wherein said hierarchical data structure defines a tree having a root node that is a common ancestor of said intermediate nodes and said leaf nodes, and said digital computer performs step b) by an acceptance/rejection selection among children of the root node.

4. The method as claimed in claim 3, wherein said digital computer repeats step b) after step c) fails to select any children of an intermediate node having a plurality of children and having a weight greater than a sum of the weights of said plurality of children.

5. The method as claimed in claim 1, wherein said step c) includes said digital computer obtaining a random number N within a range bounded by the weight of the node selected in the previous step, and said digital computer comparing the number N to a running sum of the weights of children of the node selected in the previous step.

6. The method as claimed in claim 5, wherein said digital computer selects said selected child when said number N is found to be greater or equal to said running sum just after the weight of said selected child is added to said running sum.

7. The method as claimed in claim 5, wherein the random number N is obtained by said digital computer computing said random number N as a remnant of a random number used in selecting the node selected in the previous step.

8. The method as claimed in claim 1, further comprising the steps of:

(f) said digital computer increasing the weight of one of said intermediate nodes, said one of said intermediate nodes having a parent node, (g) said digital computer checking whether the sum of the weights of the children of said parent node exceed the weight of said parent node, and when the sum of the weights of the children of said parent node exceed the weight of said parent node, said digital computer increasing the weight of said parent node so that the sum of the weights of the children of said parent node does not exceed the sum of the weights of said parent node; and (h) when the weight of said parent node is increased and said parent node is a child of another parent node, said digital computer repeating step (g) for said another parent node.

9. The method as claimed in claim 8, wherein said digital computer increases the weight of the parent node so that said weight of the parent node exceeds the sum of the weights of the children of the parent node.

10. The method as claimed in claim 1, further comprising the steps of:

(f) said digital computer decreasing the weight of one of said intermediate nodes, said one of said intermediate nodes having a parent node, (g) said digital computer checking whether the weight of said parent node exceeds the sum of the weights of the children of said parent node by more than a predetermined limit, and when the weight of said parent node exceeds the sum of the weights of the children of said parent node by more than a predetermined limit, decreasing the weight of said parent node; and (h) when the weight of said parent node is decreased and said parent node is the child of another parent node, said digital computer repeating step (g) for said another parent node.

11. A computer-implemented method of random sampling of data items arranged in a hierarchical data structure in memory of a digital computer, said hierarchical data structure having a plurality of nodes including intermediate nodes, each one of said intermediate nodes being defined by said hierarchical data structure as a child of another one of said plurality of nodes, and each one of said intermediate nodes being defined by said hierarchical data structure as a parent of another one of said plurality of nodes, each of said intermediate nodes having a number of said data items which are descendants, said method comprising the steps of:

a) said digital computer maintaining a cardinality estimate for each one of said intermediate nodes, said cardinality estimate specifying an approximation of the number of said data items which are descendants of said each one of said intermediate nodes, and said cardinality estimate not specifying exactly the number of said data items which are descendants of said each one of said intermediate nodes; said cardinality estimate being changed as the number of said data items in said hierarchical data base is changed when said approximation deviates by more than a predefined limit from the number of said data items which are descendants of said each one of said intermediate nodes;

b) said digital computer selecting at random one of said intermediate nodes such that the likelihood of selection of the selected one of said intermediate nodes is weighted proportionally to the cardinality estimate of the selected one of said intermediate nodes; and c) said digital computer selecting at random a child of said selected node such that the likelihood of selection of the selected child of said selected one of said intermediate nodes is weighted inversely proportional to the cardinality estimate of the selected one of said intermediate nodes, and said digital computer selecting one of said data items which is a descendant of said selected child of said one of said intermediate nodes, and d) said digital computer retrieving, from said memory, the selected one of said data items, whereby the likelihood of selection of the data item descendant from the selected child is substantially independent of the deviation of said approximation from the number of said plurality of nodes which are descendants of said selected one of said intermediate nodes.

12. The method as claimed in claim 11, wherein said selected one of said intermediate nodes is a child of a specified root node of said hierarchical data structure, and said digital computer performs said step b) by selecting among a multiplicity of said plurality of nodes which are children of said root node, and then said digital computer performs said step c) by selecting among a multiplicity of said plurality of nodes which are children of said selected one of said intermediate nodes.

13. The method as claimed in claim 11, wherein said digital computer performs said step c) by an acceptance/rejection selection having a likelihood of rejecting all of said multiplicity of said plurality of nodes.

14. The method as claimed in claim 11, wherein said step c) includes said digital computer obtaining a random number N within a range based on said cardinality estimate of said selected intermediate node, and said digital computer comparing the number N to a running sum of cardinality estimates of children of said intermediate node.

15. The method as claimed in claim 14, wherein said digital computer selects said number N from the range of 1 to a high cardinality estimate of said selected one of said intermediate nodes.

16. The method as claimed in claim 15, wherein said digital computer stores a respective high cardinality estimate in said memory in said hierarchical data structure in association with each of said intermediate nodes.

17. The method as claimed in claim 15, wherein said digital computer stores a respective median cardinality estimate in said memory in said hierarchical data structure in association with each of said intermediate nodes, said median cardinality estimate being changed as the number of said data items in said hierarchical data base is changed so that said median cardinality estimate deviates by no more than a predefined limit from the number of said data items which are descendants of said each one of said intermediate nodes, and said high cardinality estimate for said selected one of said intermediate nodes is computed by said digital computer multiplying a predetermined factor by said median cardinality estimate stored for said selected one of said intermediate nodes.

18. The method as claimed in claim 14, wherein said digital computer obtains the random number N by computing said random number N as a remnant of a random number used in selecting said selected intermediate node.

19. The method as claimed in claim 11, wherein said step a) includes said digital computer changing the cardinality estimate of an intermediate node when the number of descendant data items of said intermediate node is changed, and then said digital computer computing a sum of cardinality estimates of other children nodes of the parent node of said intermediate node, comparing the sum to a cardinality estimate of the parent node, and when the sum deviates from the cardinality estimate of the parent node by more than a predetermined limit, then updating the cardinality estimate of the parent node.

20. A data processing system comprising:
a) a memory having stored in it a multiplicity of data items and a tree index to said multiplicity of data items, said tree index including a root node, leaf nodes each of which is a descendant of the root node, and intermediate nodes each of which is a descendant of the root node and an ancestor of at least one leaf node; and
b) data processing means for selecting at random one of said leaf nodes, said data processing means including
  i) index maintenance means for maintaining approximate ranking information for each of said intermediate nodes, said approximate ranking information indicating an approximate rank of leaf nodes which are descendant from said each of said intermediate nodes, said approximate ranking information not indicating an exact rank of the leaf nodes which are descendant from said each of said intermediate nodes, said index maintenance means including means for propagating changes in the approximate ranking information up the tree towards the root node; and
  ii) leaf node selection means for selecting a leaf node by a random walk down the tree from the root node to a leaf node, wherein said means for selecting includes acceptance/rejection selection means for selecting a child node of a previously selected intermediate node with a selection probability based upon the approximate ranking information of the child node and the approximate ranking information of the previously selected intermediate node.

21. The data processing system as claimed in claim 20, wherein
said acceptance/rejection selection means includes means for obtaining a random number from a range based on the approximate ranking information for the previously selected node, means for comparing the random number to the approximate ranking information for child nodes of the previously selected node to either select one of the child nodes of the previous selected node or to reject all of the child nodes of the previously selected node and begin another walk down the tree.

22. The data processing system as claimed in claim 20, wherein said means for propagating includes means operated when the approximate ranking information of one of said intermediate nodes is updated for comparing the approximate ranking information of the children of said parent node to the approximate ranking information of said parent node, and updating the approximate ranking information of said parent node when the approximate ranking information of the children of said parent node is inconsistent with the approximate ranking information of said parent node.

23. The data processing system as claimed in claim 20, wherein said index maintenance means includes means for storing in said memory a cardinality estimate for each of said intermediate nodes, and wherein said acceptance/rejection selection means includes means for obtaining a random number from a range based on the approximate ranking information for the previously selected node, and means for comparing the random number to a running sum of cardinality estimates for child nodes of the previously selected node to either select one of the child nodes of the previous selected node or to reject all of the child nodes of the previously selected node and begin another walk down the tree.

24. The data processing system as claimed in claim 23, wherein said random number is obtained by computing it as a remnant of a random number used in selecting the previously selected node.

25. A data processing system comprising:
 a) a memory having stored in it a multiplicity of data items and a tree index to said multiplicity of data items, said tree index including a root node, leaf nodes each of which is a descendant of the root node and which indexes a predefined subset of said data items, and intermediate nodes each of which is a descendant of the root node and an ancestor of at least one leaf node; and
 b) data processing means for selecting at random one of said data items, said data processing means including
  i) index maintenance means for maintaining a cardinality estimate for each of said intermediate nodes, said cardinality estimate indicating an approximation of the total number of data items indexed by leaf nodes which are descendant from said each of said intermediate nodes, said cardinality estimate not indicating exactly said total number of data items indexed by leaf nodes which are descendant from said each of said intermediate nodes, said index maintenance means including means for propagating changes in the cardinality estimates up the tree towards the root node when said cardinality estimate deviates by more than a predefined limit from said total number of said data items indexed by leaf nodes which are descendant from said each of said intermediate nodes; and
  ii) data item selection means for selecting a data item by a random walk down the tree from the root node to a leaf node, wherein said means for selecting includes acceptance/rejection selection means for selecting a child node of a previously selected intermediate node with a selection probability weighted directly proportional to the cardinality estimate of the child node and inversely proportional to the cardinality estimate of the previously selected intermediate node.

26. The data processing system as claimed in claim 25, wherein
 said acceptance/rejection selection means includes means for obtaining a random number from a range based on a high cardinality estimate for the previously selected node, means for comparing the random number to a running sum of high cardinality estimates for child nodes of the previously selected node to either select one of the child nodes of the previous selected node or to reject all of the child nodes of the previously selected node and begin another walk down the tree, and
 wherein said means for propagating includes means operative when a cardinality estimate of one of said intermediate nodes is updated for computing a sum of high cardinality estimates of child nodes of the parent node of said one of said intermediate nodes, comparing the sum of high cardinality estimates to a cardinality estimate of said parent node, and updating the cardinality estimate of said parent node when the sum of high cardinality estimates is less than the high cardinality estimate of said parent node.

27. The data processing system as claimed in claim 25, wherein said means for propagating includes means for maintaining the cardinality estimates within a relative error bound (EPSILON) of the true number of descendant data items of an intermediate node such that the error bound decreases by a substantially constant factor (Q) from the top of the tree down each level (k) of the tree from the root node toward the leaf nodes.

* * * * *